US 12,513,670 B2

(12) United States Patent
Zhang et al.

(10) Patent No.: US 12,513,670 B2
(45) Date of Patent: Dec. 30, 2025

(54) MULTIPLEXING RULES FOR SUBBAND FULL DUPLEX COMMUNICATIONS

(71) Applicant: QUALCOMM Incorporated, San Diego, CA (US)

(72) Inventors: Qian Zhang, Basking Ridge, NJ (US); Yan Zhou, San Diego, CA (US); Muhammad Sayed Khairy Abdelghaffar, San Jose, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 583 days.

(21) Appl. No.: 18/050,350

(22) Filed: Oct. 27, 2022

(65) Prior Publication Data

US 2024/0147433 A1  May 2, 2024

(51) Int. Cl.
*H04W 72/0446* (2023.01)
*H04L 5/14* (2006.01)
*H04W 72/23* (2023.01)
*H04W 72/56* (2023.01)

(52) U.S. Cl.
CPC ........... *H04W 72/0446* (2013.01); *H04L 5/14* (2013.01); *H04W 72/23* (2023.01); *H04W 72/56* (2023.01)

(58) Field of Classification Search
CPC . H04W 72/0446; H04W 72/56; H04W 72/23; H04L 5/14
See application file for complete search history.

(56) References Cited

U.S. PATENT DOCUMENTS

| | | | | |
|---|---|---|---|---|
| 2021/0105812 | A1* | 4/2021 | Rastegardoost | ...... H04L 1/1671 |
| 2021/0329646 | A1* | 10/2021 | Fakoorian | ............. H04W 72/53 |
| 2023/0155871 | A1* | 5/2023 | Salem | ................... H04L 1/1896 |
| | | | | 370/329 |
| 2023/0209483 | A1* | 6/2023 | Rudolf | .............. H04W 56/0045 |
| | | | | 370/503 |

(Continued)

FOREIGN PATENT DOCUMENTS

WO   WO-2023211352 A1 * 11/2023 ........... H04L 5/0094

OTHER PUBLICATIONS

International Search Report and Written Opinion—PCT/US2023/077395—ISA/EPO—Feb. 12, 2024 (2208693WO).

(Continued)

*Primary Examiner* — Jael M Ulysse
(74) *Attorney, Agent, or Firm* — Paul M. McAdams; Holland & Hart LLP

(57) ABSTRACT

Methods, systems, and devices for wireless communications are described. A first network node may receive a control message identifying at least one symbol or at least one slot to be used for subband full duplex communications at a second network node. The first network node may receive a first indication of uplink resources for uplink communications during the at least one symbol or the at least one slot. The first network node may receive a second indication of downlink resources for downlink communications during the at least one symbol or the at least one slot. The first network node may communicate with the second network node during the at least one symbol or the at least one slot in accordance with one of the first indication or the second indication based on one or more prioritization rules.

30 Claims, 14 Drawing Sheets

(56) References Cited

U.S. PATENT DOCUMENTS

| | | | | |
|---|---|---|---|---|
| 2023/0224880 A1* | 7/2023 | Xiong | H04L 5/0044 370/329 |
| 2023/0239122 A1* | 7/2023 | Xiong | H04B 1/7143 370/280 |
| 2023/0254829 A1* | 8/2023 | Xiong | H04L 1/1861 370/329 |
| 2023/0276438 A1* | 8/2023 | Rudolf | H04W 72/1268 |
| 2023/0292294 A1* | 9/2023 | Rudolf | H04L 5/0053 |
| 2023/0328656 A1* | 10/2023 | Rudolf | H04W 52/24 |
| 2023/0328706 A1* | 10/2023 | Cozzo | H04L 5/0094 |
| 2023/0371015 A1* | 11/2023 | Lin | H04L 5/0044 |
| 2024/0039655 A1* | 2/2024 | Rudolf | H04L 1/0003 |
| 2024/0097866 A1* | 3/2024 | Nemeth | H04L 5/1469 |
| 2024/0098724 A1* | 3/2024 | Shi | H04L 5/0094 |
| 2024/0155652 A1* | 5/2024 | Noh | H04W 72/27 |
| 2024/0323961 A1* | 9/2024 | Liu | H04L 5/0044 |
| 2025/0007642 A1* | 1/2025 | You | H04L 5/00 |
| 2025/0055663 A1* | 2/2025 | Park | H04L 5/0007 |
| 2025/0105993 A1* | 3/2025 | Li | H04W 72/1263 |

OTHER PUBLICATIONS

Moderator (CATT) : "Summary #1 of Subband Non-overlapping Full Duplex", 3GPP TSG RAN WG1 #11 0bis-e, R1-2210314, 3rd Generation Partnership Project (3GPP), Mobile Competence Centre, 650, Route Des Lucioles, F-06921, Sophia-Antipolis Cedex, France, vol. RAN WG1, No. e-Meeting, Oct. 10-Oct. 19, 2022, Oct. 12, 2022, 99 Pages, XP052259782, Sect. 2.1.3.4, p. 4, paragraph 2.1.2, figures 2-5 to 2-10, Proposal 1-6, p. 26 Proposal 1-7, p. 29 Proposal 1-8, p. 31.

Qualcomm Incorporated: "Feasibility and Techniques for Subband Non-overlapping Full Duplex", 3GPP TSG RAN WG1, Meeting #110bis-e, R1-2209983, 3rd Generation Partnership Project, Mobile Competence Centre, 650, Route Des Lucioles, F-06921 Sophia-Antipolis Cedex, France, vol. RAN WG1, No. e-Meeting, Oct. 10-Oct. 19, 2022, Sep. 30, 2022, XP052259454, 37 Pages, Section 2.6.1, Sections 3.5, 3.3, 4, para [2.6.3], p. 19, para 3.5-p. 21, para 3.6, p. 20, line 21-p. 21, line 23, para [02.2] para [02.5].

SONY: "Considerations on Subband Full Duplex TDD Operations", 3GPP TSG RAN WG1 #110bis-e, R1-2209099, 3rd Generation Partnership Project (3GPP), Mobile Competence Centre, 650, Route Des Lucioles, F-06921, Sophia-Antipolis Cedex, France, vol. RAN WG1, No. e-Meeting, Oct. 10-Oct. 19, 2022, Sep. 30, 2022, 13 Pages, XP052277018, Section 2.7.

ZTE: "Discussion of Subband Non-Overlapping Full Duplex", 3GPP TSG RAN WG1 #110bis-e, R1-2208484, 3rd Generation Partnership Project (3GPP), Mobile Competence Centre, 650, Route Des Lucioles, F-06921, Sophia-Antipolis Cedex, France, vol. RAN WG1, No. e-Meeting, Oct. 10-Oct. 19, 2022, Sep. 30, 2022, pp. 1-14, XP052276410, Section 4.3.

* cited by examiner

MULTIPLEXING RULES FOR SUBBAND FULL DUPLEX COMMUNICATIONS

INTRODUCTION

The following relates to wireless communications that involve multiplexing rules for subband full duplex (SBFD) communications. Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support multiplexing rules for subband full duplex (SBFD) communications. For example, the described techniques provide a framework for managing conflicting configuration information pertaining to a same transmission time interval (TTI), such as a slot or symbol. For example, a first network node such as a user equipment (UE) may receive a control message identifying at least one symbol or at least one slot to be used for SBFD communications at a second network node (such as a base station, also referenced herein as a network entity). In some examples, the first network node may receive a first indication of uplink resources for uplink communications during the at least one symbol or the at least one slot. Additionally, the first network node may receive a second indication of downlink resources for downlink communications during the at least one symbol or the at least one slot. In some examples, the first network node may communicate with the second network node during the at least one symbol or the at least one slot in accordance with one of the first indication or the second indication based on one or more prioritization rules. In some examples, using the one or more prioritization rules to determine whether to communicate in accordance with the first indication or the second indication may lead to reduced latency and increased resource utilization, among other possible benefits.

A method for wireless communication at first network node is described. The method may include receiving a control message identifying at least one symbol or at least one slot to be used for SBFD communications at a second network node, receiving a first indication of uplink resources for uplink communications during the at least one symbol or the at least one slot, receiving a second indication of downlink resources for downlink communications during the at least one symbol or the at least one slot, and communicating with the second network node during the at least one symbol or the at least one slot in accordance with one of the first indication or the second indication based on one or more prioritization rules.

An apparatus for wireless communication at first network node is described. The apparatus may include a memory and at least one processor coupled to the memory. The at least one processor is configured to receive a control message identifying at least one symbol or at least one slot to be used for SBFD communications at a second network node, receive a first indication of uplink resources for uplink communications during the at least one symbol or the at least one slot, receive a second indication of downlink resources for downlink communications during the at least one symbol or the at least one slot, and communicate with the second network node during the at least one symbol or the at least one slot in accordance with one of the first indication or the second indication based on one or more prioritization rules.

Another apparatus for wireless communication at first network node is described. The apparatus may include means for receiving a control message identifying at least one symbol or at least one slot to be used for SBFD communications at a second network node, means for receiving a first indication of uplink resources for uplink communications during the at least one symbol or the at least one slot, means for receiving a second indication of downlink resources for downlink communications during the at least one symbol or the at least one slot, and means for communicating with the second network node during the at least one symbol or the at least one slot in accordance with one of the first indication or the second indication based on one or more prioritization rules.

A non-transitory computer-readable medium having code for wireless communication stored thereon is described. The code stored thereon, when executed by a first network node, causes the first network node to receive a control message identifying at least one symbol or at least one slot to be used for SBFD communications at a second network node, receive a first indication of uplink resources for uplink communications during the at least one symbol or the at least one slot, receive a second indication of downlink resources for downlink communications during the at least one symbol or the at least one slot, and communicate with the second network node during the at least one symbol or the at least one slot in accordance with one of the first indication or the second indication based on one or more prioritization rules.

In some examples of the method, apparatuses, and non-transitory computer-readable medium described herein, the uplink resources may be within at least one uplink subband or at least one flexible subband and the downlink resources may be within at least one downlink subband or the at least one flexible subband.

In some examples of the method, apparatuses, and non-transitory computer-readable medium described herein, the first indication may be for transmission of an uplink signal within at least one uplink subband or at least one flexible subband during the at least one symbol or the at least one slot and the second indication may be for reception of a synchronization signal block (SSB) within at least one downlink subband or at least one flexible subband during the at least one symbol or the at least one slot.

In some examples of the method, apparatuses, and non-transitory computer-readable medium described herein, the first indication includes an uplink slot format indicator (SFI) pertaining to the at least one symbol or the at least one slot.

In some examples of the method, apparatuses, and non-transitory computer-readable medium described herein, the uplink signal includes a physical uplink control channel (PUCCH) signal, a physical uplink shared channel (PUSCH) signal, a sounding reference signal (SRS), or a random access preamble.

In some examples of the method, apparatuses, and non-transitory computer-readable medium described herein, the first indication may be for transmission of a random access preamble within at least one uplink subband or at least one flexible subband during the at least one symbol or the at least one slot and the second indication may be for reception of a downlink signal within at least one downlink subband or the at least one flexible subband during the at least one symbol or the at least one slot.

In some examples of the method, apparatuses, and non-transitory computer-readable medium described herein, the second indication includes a downlink SFI pertaining to the at least one symbol or the at least one slot.

In some examples of the method, apparatuses, and non-transitory computer-readable medium described herein, the first indication may be for transmission of an uplink signal within at least one uplink subband or at least one flexible subband during the at least one symbol or the at least one slot and the second indication may be for monitoring a downlink control channel within at least one downlink subband or the at least one flexible subband during the at least one symbol or the at least one slot.

In some examples of the method, apparatuses, and non-transitory computer-readable medium described herein, the first indication includes an uplink SFI pertaining to the at least one symbol or the at least one slot.

In some examples of the method, apparatuses, and non-transitory computer-readable medium described herein, the first indication may be for transmission of an uplink signal within at least one uplink subband or at least one flexible subband during the at least one symbol or the at least one slot and the second indication may be for reception of a downlink signal within at least one downlink subband or the at least one flexible subband during the at least one symbol or the at least one slot.

In some examples of the method, apparatuses, and non-transitory computer-readable medium described herein, the first indication includes an uplink SFI pertaining to the at least one symbol or the at least one slot and the second indication includes a radio resource control (RRC) configuration pertaining to the at least one symbol or the at least one slot.

In some examples of the method, apparatuses, and non-transitory computer-readable medium described herein, the uplink signal includes a PUCCH signal, a PUSCH signal, an SRS, or a random access preamble.

In some examples of the method, apparatuses, and non-transitory computer-readable medium described herein, the first indication includes an RRC configuration pertaining to the at least one symbol or the at least one slot and the second indication includes a downlink SFI pertaining to the at least one symbol or the at least one slot.

In some examples of the method, apparatuses, and non-transitory computer-readable medium described herein, the downlink signal includes a physical downlink control channel (PDCCH) signal, a physical downlink shared channel (PDSCH) signal, a channel state information reference signal (CSI-RS), or a positioning reference signal (PRS).

In some examples of the method, apparatuses, and non-transitory computer-readable medium described herein, the second indication includes a flexible RRC configuration pertaining to the at least one symbol or the at least one slot.

In some examples of the method, apparatuses, and non-transitory computer-readable medium described herein, the uplink signal includes a PUCCH signal, a PUSCH signal, an SRS, or a random access preamble.

In some examples of the method, apparatuses, and non-transitory computer-readable medium described herein, the first indication includes an uplink SFI pertaining to the at least one symbol or the at least one slot and the second indication includes a dynamic grant pertaining to the at least one symbol or the at least one slot and the downlink signal includes a PDSCH signal or a CSI-RS.

In some examples of the method, apparatuses, and non-transitory computer-readable medium described herein, the first indication includes an uplink SFI or a flexible SFI pertaining to the at least one symbol or the at least one slot and the downlink signal includes a PDCCH signal, a semi-persistent downlink signal, or a CSI-RS.

In some examples of the method, apparatuses, and non-transitory computer-readable medium described herein, the first indication includes a dynamic grant pertaining to the at least one symbol or the at least one slot and the second indication includes a downlink SFI pertaining to the at least one symbol or the at least one slot and the uplink signal includes a PUCCH signal, a PUSCH signal, an SRS, or a random access preamble.

In some examples of the method, apparatuses, and non-transitory computer-readable medium described herein, the second indication includes a downlink SFI or a flexible SFI pertaining to the at least one symbol or the at least one slot and the uplink signal includes a PUCCH signal, a PUSCH signal, an SRS, or a random access preamble.

In some examples of the method, apparatuses, and non-transitory computer-readable medium described herein, the first indication includes a dynamic grant pertaining to the at least one symbol or the at least one slot and the downlink signal includes a PDCCH signal, a semi-persistent downlink signal, a CSI-RS, or a PRS.

In some examples of the method, apparatuses, and non-transitory computer-readable medium described herein, the second indication includes a dynamic grant pertaining to the at least one symbol or the at least one slot and the uplink signal includes a PUCCH signal, a PUSCH signal, an SRS, or a random access preamble.

In some examples of the method, apparatuses, and non-transitory computer-readable medium described herein, the first indication includes an uplink SFI, a flexible SFI, an RRC configuration, or a dynamic grant pertaining to the at least one symbol or the at least one slot.

In some examples of the method, apparatuses, and non-transitory computer-readable medium described herein, the second indication includes a downlink SFI, a flexible SFI, an RRC configuration, or a dynamic grant pertaining to the at least one symbol or the at least one slot.

In some examples of the method, apparatuses, and non-transitory computer-readable medium described herein, the uplink signal includes a PUCCH signal, a PUSCH signal, an SRS, or a random access preamble.

In some examples of the method, apparatuses, and non-transitory computer-readable medium described herein, the downlink signal includes a PDCCH signal, a PDSCH signal, a CSI-RS, or a PRS.

In some examples of the method, apparatuses, and non-transitory computer-readable medium described herein, the one or more prioritization rules include that reception of the downlink signal may be prioritized over transmission of the uplink signal during the at least one symbol or the at least one slot in an absence of a beam failure recovery procedure being triggered, and that transmission of the uplink signal may be prioritized over reception of the downlink signal during the at least one symbol or the at least one slot in a presence of a beam failure recovery procedure being triggered.

In some examples of the method, apparatuses, and non-transitory computer-readable medium described herein, the second indication includes a downlink SFI pertaining to the at least one symbol or the at least one slot and the downlink signal includes a PDSCH signal, a semi-persistent downlink signal, or a CSI-RS.

In some examples of the method, apparatuses, and non-transitory computer-readable medium described herein, the first indication includes a flexible RRC configuration pertaining to the at least one symbol or the at least one slot and the uplink signal includes an SRS or a random access preamble.

In some examples of the method, apparatuses, and non-transitory computer-readable medium described herein, the one or more prioritization rules include that reception of the downlink signal or transmission of the uplink signal may be prioritized based on a respective channel priority associated with each of the downlink signal and uplink signal.

In some examples of the method, apparatuses, and non-transitory computer-readable medium described herein, the uplink resources and the downlink resources may be within one or more carriers to be used for time division duplex (TDD) communications between the first network node and the second network node.

In some examples of the method, apparatuses, and non-transitory computer-readable medium described herein, the first indication may be for a first component carrier of a radio frequency spectrum band and the second indication may be for a second component carrier of the radio frequency spectrum band, the first component carrier different from the second component carrier.

In some examples of the method, apparatuses, and non-transitory computer-readable medium described herein, the control message further identifies one or more of a frequency location of at least one uplink subband to be used for transmission of uplink messages during the at least one symbol or the at least one slot, at least one downlink subband to be used for reception of downlink messages during the at least one symbol or the at least one slot, at least one guard band in between an uplink subband and a downlink subband during the at least one symbol or the at least one slot, and at least one flexible subband to be used for transmission of the uplink messages or reception of the downlink messages during the at least one symbol or the at least one slot.

In some examples of the method, apparatuses, and non-transitory computer-readable medium described herein, the uplink resources or the downlink resources include periodic resources or semi-persistent resources.

In some examples of the method, apparatuses, and non-transitory computer-readable medium described herein, the first network node includes a user equipment (UE) and the second network node includes a base station.

A method for wireless communication at a network node is described. The method may include outputting a control message identifying at least one symbol or at least one slot to be used for SBFD communications at the network node, outputting a first indication of uplink resources for uplink communications during the at least one symbol or the at least one slot, outputting a second indication of downlink resources for downlink communications during the at least one symbol or the at least one slot, and communicating, during the at least one symbol or the at least one slot, in accordance with one of the first indication or the second indication based on one or more prioritization rules.

An apparatus for wireless communication at a network node is described. The apparatus may include a memory and at least one processor coupled with the memory. The at least one processor is configured to output a control message identifying at least one symbol or at least one slot to be used for SBFD communications at the network node, output a first indication of uplink resources for uplink communications during the at least one symbol or the at least one slot, output a second indication of downlink resources for downlink communications during the at least one symbol or the at least one slot, and communicating, during the at least one symbol or the at least one slot, in accordance with one of the first indication or the second indication base on one or more prioritization rules.

Another apparatus for wireless communication at a network node is described. The apparatus may include means for outputting a control message identifying at least one symbol or at least one slot to be used for SBFD communications at the network node, means for outputting a first indication of uplink resources for uplink communications during the at least one symbol or the at least one slot, means for outputting a second indication of downlink resources for downlink communications during the at least one symbol or the at least one slot, and means for communicating, during the at least one symbol or the at least one slot, in accordance with one of the first indication or the second indication based on one or more prioritization rules.

A non-transitory computer-readable medium having code for wireless communication stored thereon described. The code stored thereon, when executed by a network node, causes the network node to output a control message identifying at least one symbol or at least one slot to be used for SBFD communications at the network node, output a first indication of uplink resources for uplink communications during the at least one symbol or the at least one slot, output a second indication of downlink resources for downlink communications during the at least one symbol or the at least one slot, and communicating, during the at least one symbol or the at least one slot, in accordance with one of the first indication or the second indication base on one or more prioritization rules.

In some examples of the method, apparatuses, and non-transitory computer-readable medium described herein, the uplink resources may be within at least one uplink subband or at least one flexible subband and the downlink resources may be within at least one downlink subband or the at least one flexible subband.

In some examples of the method, apparatuses, and non-transitory computer-readable medium described herein, the first indication may be for communication of an uplink signal within at least one uplink subband or at least one flexible subband during the at least one symbol or the at least one slot and the second indication may be for communication of an SSB within at least one downlink subband or the at least one flexible subband during the at least one symbol or the at least one slot.

In some examples of the method, apparatuses, and non-transitory computer-readable medium described herein, the first indication includes an uplink SFI pertaining to the at least one symbol or the at least one slot.

In some examples of the method, apparatuses, and non-transitory computer-readable medium described herein, the uplink signal includes a PUCCH signal, a PUSCH signal, an SRS, or a random access preamble.

In some examples of the method, apparatuses, and non-transitory computer-readable medium described herein, the first indication may be for communication of a random access preamble within at least one uplink subband or at least one flexible subband during the at least one symbol or the at least one slot and the second indication may be for communication of a downlink signal within at least one downlink subband or the at least one flexible subband during the at least one symbol or the at least one slot.

In some examples of the method, apparatuses, and non-transitory computer-readable medium described herein, the second indication includes a downlink SFI pertaining to the at least one symbol or the at least one slot.

In some examples of the method, apparatuses, and non-transitory computer-readable medium described herein, the first indication may be for communication of an uplink signal within at least one uplink subband or at least one flexible subband during the at least one symbol or the at least one slot and the second indication may be for communication using a downlink control channel within at least one downlink subband or the at least one flexible subband during the at least one symbol or the at least one slot.

In some examples of the method, apparatuses, and non-transitory computer-readable medium described herein, the first indication includes an uplink SFI pertaining to the at least one symbol or the at least one slot.

In some examples of the method, apparatuses, and non-transitory computer-readable medium described herein, the first indication may be for communication of an uplink signal within at least one uplink subband or at least one flexible subband during the at least one symbol or the at least one slot and the second indication may be for communication of a downlink signal within at least one downlink subband or the at least one flexible subband during the at least one symbol or the at least one slot.

In some examples of the method, apparatuses, and non-transitory computer-readable medium described herein, the first indication includes an uplink SFI pertaining to the at least one symbol or the at least one slot and the second indication includes an RRC configuration pertaining to the at least one symbol or the at least one slot.

In some examples of the method, apparatuses, and non-transitory computer-readable medium described herein, the uplink signal includes a PUCCH signal, a PUSCH signal, an SRS, or a random access preamble.

In some examples of the method, apparatuses, and non-transitory computer-readable medium described herein, the first indication includes an RRC configuration pertaining to the at least one symbol or the at least one slot and the second indication includes a downlink SFI pertaining to the at least one symbol or the at least one slot.

In some examples of the method, apparatuses, and non-transitory computer-readable medium described herein, the downlink signal includes a PDCCH signal, a PDSCH signal, a CSI-RS, or a PRS.

In some examples of the method, apparatuses, and non-transitory computer-readable medium described herein, the second indication includes a flexible RRC configuration pertaining to the at least one symbol or the at least one slot.

In some examples of the method, apparatuses, and non-transitory computer-readable medium described herein, the uplink signal includes a PUCCH signal, a PUSCH signal, an SRS, or a random access preamble.

In some examples of the method, apparatuses, and non-transitory computer-readable medium described herein, the first indication includes an uplink SFI pertaining to the at least one symbol or the at least one slot and the second indication includes a dynamic grant pertaining to the at least one symbol or the at least one slot and the downlink signal includes a PDSCH signal or a CSI-RS.

In some examples of the method, apparatuses, and non-transitory computer-readable medium described herein, the first indication includes an uplink SFI or a flexible SFI pertaining to the at least one symbol or the at least one slot and the downlink signal includes a PDCCH signal, a semi-persistent downlink signal, or a CSI-RS.

In some examples of the method, apparatuses, and non-transitory computer-readable medium described herein, the first indication includes a dynamic grant pertaining to the at least one symbol or the at least one slot and the second indication includes a downlink SFI pertaining to the at least one symbol or the at least one slot and the uplink signal includes a PUCCH signal, a PUSCH signal, an SRS, or a random access preamble.

In some examples of the method, apparatuses, and non-transitory computer-readable medium described herein, the second indication includes a downlink SFI or a flexible SFI pertaining to the at least one symbol or the at least one slot and the uplink signal includes a PUCCH signal, a PUSCH signal, an SRS, or a random access preamble.

In some examples of the method, apparatuses, and non-transitory computer-readable medium described herein, the first indication includes a dynamic grant pertaining to the at least one symbol or the at least one slot and the downlink signal includes a PDCCH signal, a semi-persistent downlink signal, a CSI-RS, or a PRS.

In some examples of the method, apparatuses, and non-transitory computer-readable medium described herein, the second indication includes a dynamic grant pertaining to the at least one symbol or the at least one slot and the uplink signal includes a PUCCH signal, a PUSCH signal, an SRS, or a random access preamble.

In some examples of the method, apparatuses, and non-transitory computer-readable medium described herein, the first indication includes an uplink SFI, a flexible SFI, an RRC configuration, or a dynamic grant pertaining to the at least one symbol or the at least one slot.

In some examples of the method, apparatuses, and non-transitory computer-readable medium described herein, the second indication includes a downlink SFI, a flexible SFI, an RRC configuration, or a dynamic grant pertaining to the at least one symbol or the at least one slot.

In some examples of the method, apparatuses, and non-transitory computer-readable medium described herein, the uplink signal includes a PUCCH signal, a PUSCH signal, an SRS, or a random access preamble.

In some examples of the method, apparatuses, and non-transitory computer-readable medium described herein, the downlink signal includes a PDCCH signal, a PDSCH signal, a CSI-RS, or a PRS.

In some examples of the method, apparatuses, and non-transitory computer-readable medium described herein, the one or more prioritization rules include that communication of the downlink signal may be prioritized over communication of the uplink signal during the at least one symbol or the at least one slot in an absence of a beam failure recovery procedure being triggered, and that communication of the uplink signal may be prioritized over communication of the downlink signal during the at least one symbol or the at least one slot in a presence of a beam failure recovery procedure being triggered.

In some examples of the method, apparatuses, and non-transitory computer-readable medium described herein, the second indication includes a downlink SFI pertaining to the at least one symbol or the at least one slot and the downlink signal includes a PDSCH signal, a semi-persistent downlink signal, or a CSI-RS.

In some examples of the method, apparatuses, and non-transitory computer-readable medium described herein, the first indication includes a flexible RRC configuration pertaining to the at least one symbol or the at least one slot and the uplink signal includes an SRS or a random access preamble.

In some examples of the method, apparatuses, and non-transitory computer-readable medium described herein, the one or more prioritization rules include that communication of the downlink signal or the uplink signal may be prioritized based on a respective channel priority associated with each of the downlink signal and uplink signal.

In some examples of the method, apparatuses, and non-transitory computer-readable medium described herein, the uplink resources and the downlink resources may be within one or more carriers to be used for TDD communications at the method.

In some examples of the method, apparatuses, and non-transitory computer-readable medium described herein, the first indication may be for a first component carrier of a radio frequency spectrum band and the second indication may be for a second component carrier of the radio frequency spectrum band, the first component carrier different from the second component carrier.

In some examples of the method, apparatuses, and non-transitory computer-readable medium described herein, the control message further identifies one or more of a frequency location of at least one uplink subband to be used for communication of uplink messages during the at least one symbol or the at least one slot, at least one downlink subband to be used for communication of downlink messages during the at least one symbol or the at least one slot, at least one guard band in between an uplink subband and a downlink subband during the at least one symbol or the at least one slot, and at least one flexible subband to be used for communication of the uplink messages or the downlink messages during the at least one symbol or the at least one slot.

In some examples of the method, apparatuses, and non-transitory computer-readable medium described herein, the uplink resources or the downlink resources include periodic resources or semi-persistent resources.

In some examples of the method, apparatuses, and non-transitory computer-readable medium described herein, the network node includes a base station.

DETAILED DESCRIPTION

Figure 1:
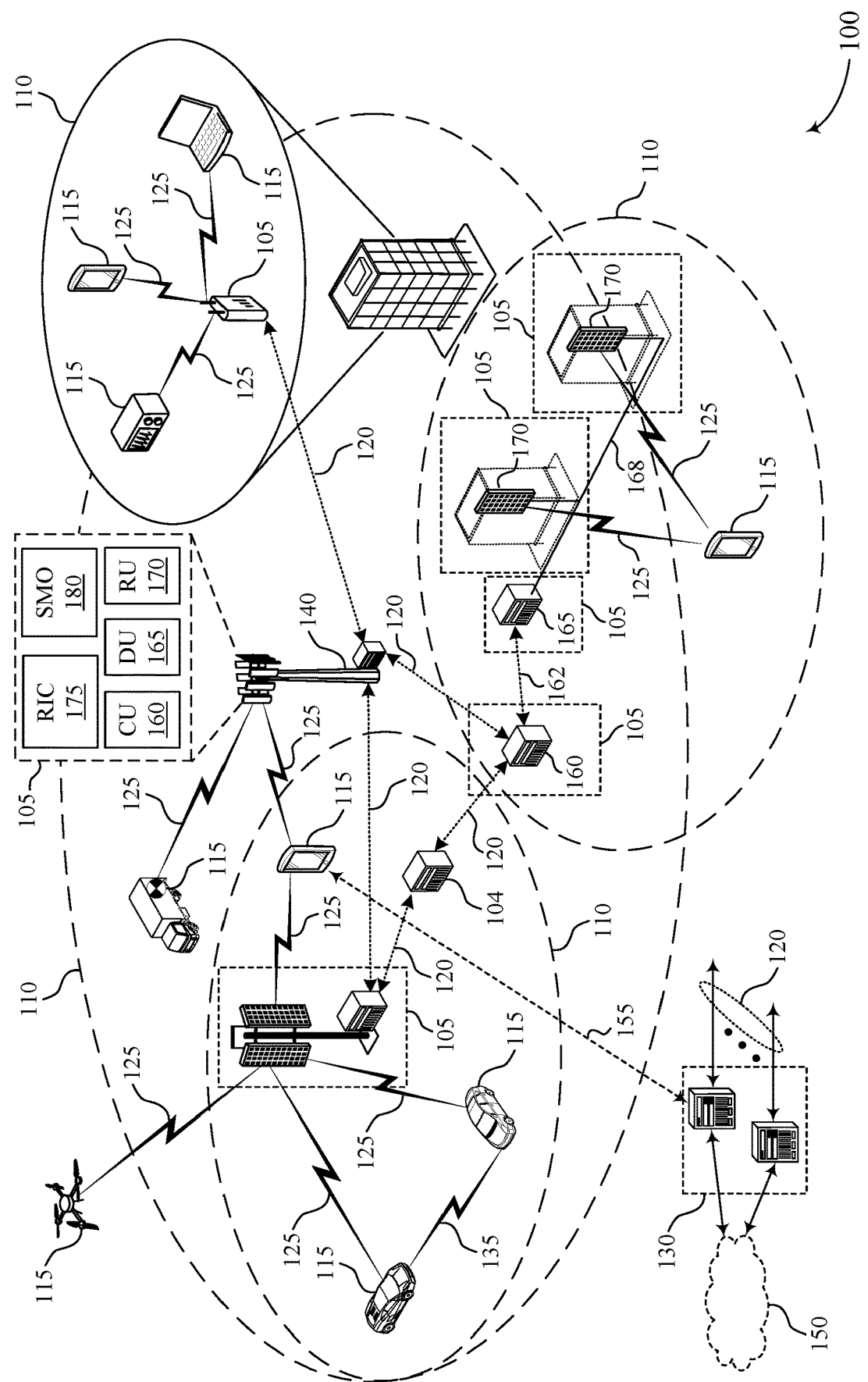
FIGS. 1 and 2 each illustrate an example of a wireless communications system that supports multiplexing rules for subband full duplex (SBFD) communications in accordance with one or more aspects of the present disclosure.

In some wireless communications systems, a communication device, such as a user equipment (UE) or a network entity (e.g., a base station), may support wireless communications using one or multiple radio access technologies (RATs). Examples of RATs may include fourth generation (4G) systems, such as Long Term Evolution (LTE) systems, and fifth generation (5G) systems, which may be referred to as New Radio (NR) systems, among other generations, such as subsequent generations. In such cases, the communication device may operate in a half duplex mode or a full duplex mode, or a combination thereof. In a half duplex mode, the communication device may either transmit communications or receive communications during a time period, such as a transmission time interval (TTI) that may span one or more time resources (e.g., symbols, mini-slots, slots, etc.). In a full duplex mode, the communication device may simultaneously transmit and receive communications during the time period. That is, communications received at the communication device may overlap in the time domain with communications transmitted at the communication device. For example, symbols or slots occupied by received signals may overlap with symbols or slots occupied by transmitted signals.

In some examples, a communication device (e.g., a network entity) may support multi-user multiple input multiple output (MU-MIMO) using full duplex communications, such that the communication device may simultaneously communicate with multiple other communication devices (e.g., multiple UEs). For example, downlink communications transmitted at the network entity to a first UE may overlap in time with uplink communications received at the network entity from a second UE. In some examples, the downlink communications transmitted at the network entity may interfere with the uplink communications received at the network entity. That is, the network entity may experience signal leakage between an antenna panel used at the network entity for transmissions and another antenna panel used at the network entity for receptions. Such interference may be referred to as self-interference.

In some examples, to reduce self-interference, the network entity may support subband full duplex (SBFD) operations in which the network entity may use multiple subbands for uplink receptions and downlink transmissions. At the same time, the UEs with which the network entity communicates may be limited to half-duplex communications. For example, the network entity may simultaneously use an uplink subband (or a flexible subband) for reception of uplink communications from a first UE and a downlink subband (or another flexible subband) for transmission of downlink communications to a second UE. In such examples, the UEs may be configured to concurrently communicate with the network entity using half duplex time division duplexing (TDD). That is, during a TTI, each UE may be capable of communicating with the network entity in either an uplink direction or in a downlink direction. In some examples, the transmission direction for a TTI may be designated (e.g., configured at the UE). However, because the network entity may use full duplex subbands during a TTI for simultaneous uplink and downlink communications, each UE may be capable of communicating with the network entity in either an uplink direction or in a downlink direction during the TTI, irrespective of a transmission direction designated for the TTI. That is, use of full duplex subbands at the network entity during a TTI may enable a TDD TTI designation at a UE to be overwritten. In some examples, however, the UEs (e.g., and the network entity) may be configured with one or more multiplexing rules based on half duplex operations. For example, in accordance with such rules, the UEs may refrain from monitoring for (or the network entity may refrain from transmitting) messages scheduling both uplink communications and downlink communications during a same TTI (e.g., a same slot or symbol). Accordingly, multiplexing rules based on half duplex operations may not support overwriting a TDD TTI designation, which may lead to reduced resource utilization and unnecessary increases in latency.

Various aspects of the present disclosure generally relate to techniques that support multiplexing rules for SBFD communications, and more specifically, to a framework for managing conflicting configuration information pertaining to a same TTI. For example, a UE performing TDD with a network entity may receive multiple (e.g., different) messages that schedule both uplink communications and downlink communications within a same TTI (e.g., a same slot or a same symbol). In such an example, the UE may be configured with one or more multiplexing rules that support SBFD operations at the network entity. For example, such multiplexing rules may enable the UE to be simultaneously configured with an uplink configuration and a downlink configuration for the same TTI. That is, multiplexing rules that support SBFD operations at the network entity may enable the UE to receive conflicting configuration information pertaining to the same TTI. In such an example, the UE may be configured with one or more prioritization rules to manage the conflicting configuration information. For example, the UE may use the one or more prioritization rules to determine whether to communicate according to the uplink configuration or the downlink configuration during the TTI. In some examples, the prioritization rules may indicate, to the UE, to communicate an uplink signal according to the uplink configuration or a downlink signal according to the downlink configuration during the TTI based on a respective channel priority associated with each of the downlink signal or the uplink signal.

Particular aspects of the subject matter described herein may be implemented to realize one or more of the potential advantages. For example, the techniques employed by the described communication devices may provide benefits and enhancements to the operation of the communication devices, including enhancements to TDD communications between the communication devices. For example, operations performed by the described communication devices may enable a communication device to receive conflicting configuration information pertaining to a same TTI and provide a framework for managing the conflicting configuration information. In some implementations, the operations performed by the described communication devices to manage the conflicting configuration information may include using one or more prioritization rules to identify a configuration to use during the TTI. In examples, the operations performed by the described communication devices may support reduced latency and increased resource utilization, among other benefits.

Aspects of the disclosure are initially described in the context of wireless communications systems. Aspects of the disclosure at also described in the context of SBFD configurations and a process flow. Aspects of the disclosure are further illustrated by and described with reference to apparatus diagrams, system diagrams, and flowcharts that relate to multiplexing rules for SBFD communications.

FIG. 1 illustrates an example of a wireless communications system 100 that supports multiplexing rules for SBFD communications in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node (which may be referred to as a node, a network node, a network entity, or a wireless node) may include, be, or be included in (e.g., be a component of) a base station (e.g., any base station described herein), a UE (e.g., any UE described herein), a network controller, an apparatus, a device, a computing system, an integrated access and backhauling (IAB) node, a distributed unit (DU), a central unit (CU), a remote/radio unit (RU) (which may also be referred to as a remote radio unit (RRU)), and/or another processing entity configured to perform any of the techniques described herein. For example, a network node may be a UE. As another example, a network node may be a base station or network entity. As another example, a first network node may be configured to communicate with a second network node or a third network node. In one aspect of this example, the first network node may be a UE, the second network node may be a base station, and the third network node may be a UE. In another aspect of this example, the first network node may be a UE, the second network node may be a base station, and the third network node may be a base station. In yet other aspects of this example, the first, second, and third network nodes may be different relative to these examples. Similarly, reference to a UE, base station, apparatus, device, computing system, or the like may include disclosure of the UE, base station, apparatus, device, computing system, or the like being a network node. For example, disclosure that a UE is configured to receive information from a base station also discloses that a first network node is configured to receive information from a second network node. Consistent with this disclosure, once a specific example is broadened in accordance with this disclosure (e.g., a UE is configured to receive information from a base station also discloses that a first network node is configured to receive information from a second network node), the broader example of the narrower example may be interpreted in the reverse, but in a broad open-ended way. In the example above where a UE is configured to receive information from a base station also discloses that a first network node is configured to receive information from a second network node, the first network node may refer to a first UE, a first base station, a first apparatus, a first device, a first computing system, a first set of one or more one or more components, a first processing entity, or the like configured to receive the information; and the second network node may refer to a second UE, a second base station, a second apparatus, a second device, a second computing system, a second set of one or more components, a second processing entity, or the like.

As described herein, communication of information (e.g., any information, signal, or the like) may be described in various aspects using different terminology. Disclosure of one communication term includes disclosure of other communication terms. For example, a first network node may be described as being configured to transmit information to a second network node. In this example and consistent with this disclosure, disclosure that the first network node is configured to transmit information to the second network node includes disclosure that the first network node is configured to provide, send, output, communicate, or transmit information to the second network node. Similarly, in this example and consistent with this disclosure, disclosure that the first network node is configured to transmit information to the second network node includes disclosure that the second network node is configured to receive, obtain, or decode the information that is provided, sent, output, communicated, or transmitted by the first network node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support multiplexing rules for SBFD communications as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and TDD component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a subband, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a TTI. In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MIME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

In some examples, the wireless communications system 100 may support multiplexing rules for SBFD communications and a framework for managing conflicting configuration information pertaining to a same TTI. For example, the network entity 105 may support SBFD operations with multiple UEs 115, which may operate using half duplex TDD. In such an example, a UE 115 may receive a control message identifying at least one TTI (e.g., at least one symbol or at least one slot) to be used for SBFD communications at the network entity 105. Additionally, the UE 115 may receive a first indication of uplink resources for uplink communications during the at least one TTI and a second indication of downlink resources for downlink communications during the at least one TTI. In some examples, the UE 115 may communicate with the network entity 105 during the at least one TTI in accordance with one of the first indication or the second indication based on one or more prioritization rules. That is, the UE 115 may use the one or more prioritization rules to determine whether to use the indicated uplink resources to communicate with the network entity 105 during the at least one TTI in the uplink direction or use the downlink resources to communicate with the network entity 105 during the at least one TTI in the downlink direction. In some examples, using the one or more prioritization rules to manage conflicting configuration information pertaining to a same TTI may lead to recued latency within the wireless communications system 100, among other possible benefits.

Figure 2:
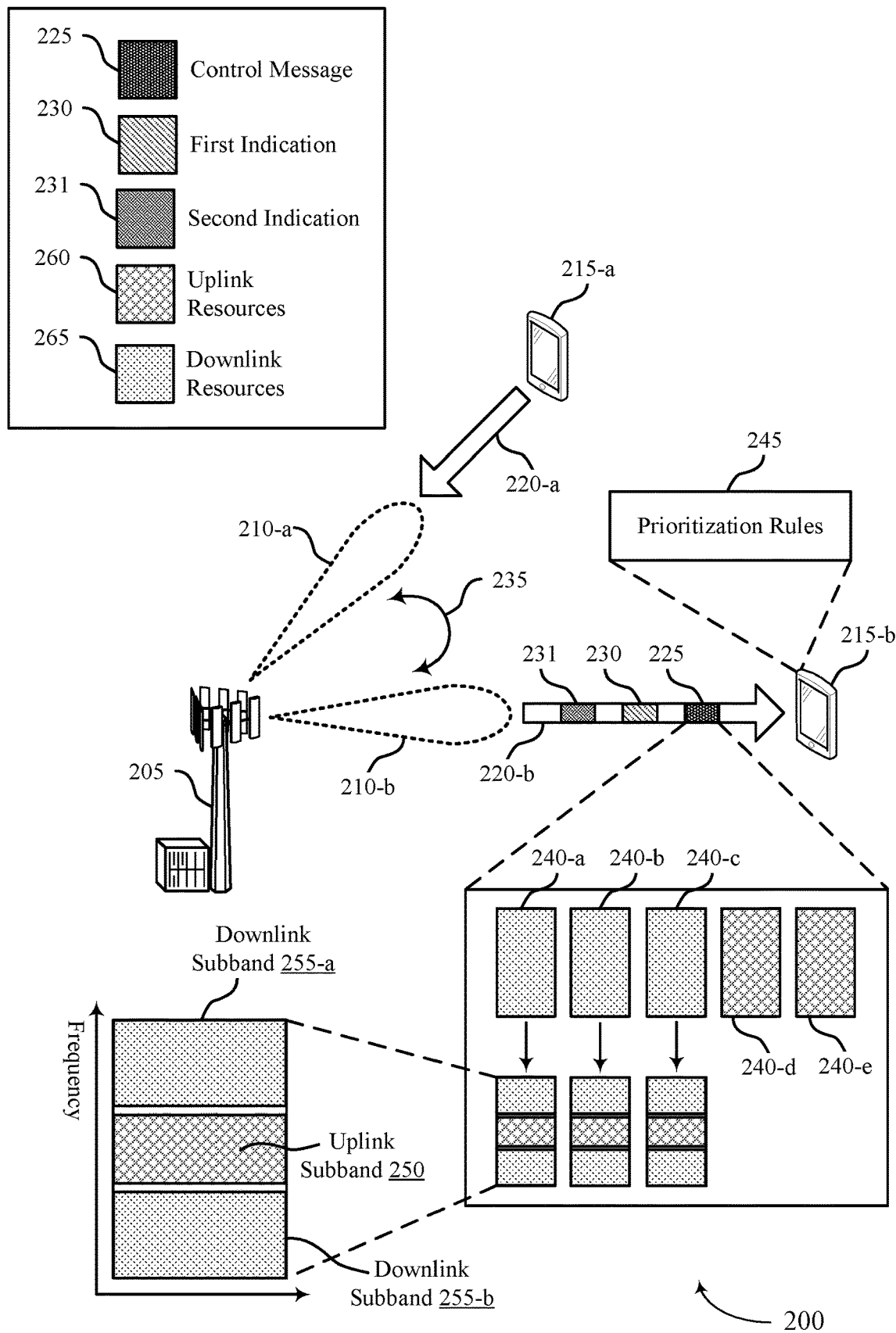

FIG. 2 illustrates an example of a wireless communications system 200 that supports multiplexing rules for SBFD communications in accordance with one or more aspects of the present disclosure. The wireless communications system 200 may implement or be implemented at one or more aspects of the wireless communications system 100. For example, the wireless communications system 200 may include a network entity 205, a UE 215-a, and a UE 215-b, which may be examples of the corresponding devices as discussed with reference to FIG. 1. In some examples, the wireless communications system 200 may implement or be implemented at one or more aspects of the wireless communications system 100. For example, the wireless communications system 200 may include a UE 215-a and a UE 215-b, which may be examples of a UE 115 as described with reference to FIG. 1. The wireless communications system 200 may also include a network entity 205, which may be an example of one or more of the network entities 105 (e.g., a CU, a DU, an RU, a base station, an IAB node, or one or more other network nodes) as described with reference to FIG. 1. The network entity 205 may communicate with the UE 215-a and the UE 215-b using a communication link 220-a and a communication link 220-b, respectively. The communication links 220 may be examples of a communication link 125 as described with reference to FIG. 1. The wireless communications system 200 may include features for improved communications between the network entity 205 and the UEs 215, among other possible benefits.

The wireless communications system 200 (e.g., an NR system) may support one or more types of duplex operations (e.g., half duplex operations, full duplex operations). For example, the wireless communications system 200 may support one or more types of duplex operations for one or more deployment scenarios. Performance evaluation results associated with the one or more types of duplex operations supported within the wireless communications system 200 may be obtained using an evaluation (e.g., use of an evaluation methodology) of the one or more types of duplex operations. In some examples, the wireless communications system 200 may support subband non-overlapping full duplex. For example, the wireless communications system 200 may support a co-existence of one or more uplink subbands and one or more downlink subbands in co-channels and adjacent channels. Additionally, or alternatively, the wireless communications system 200 may support dynamic or flexible TDD. For example, the wireless communications system may support the co-existence of the one or more uplink subband and the one or more downlink subbands in co-channels and adjacent channels that may be configured for TDD.

For example, the wireless communications system 200 may support one or more potential enhancements to support multiple types of duplex operations (e.g., duplex evolution) for TDD. In some examples, the wireless communications system 200 may support multiple types of duplex operations for TDD (e.g., NR TDD) using paired radio frequency spectrum bands or an unpaired radio frequency spectrum band. In some instances, paired radio frequency spectrum bands may be referred to as a paired spectrum. Additionally, or alternatively, unpaired radio frequency spectrum bands may be referred to as an unpaired spectrum. As described herein, paired radio frequency spectrum bands (e.g., paired operating bands) may refer to an operating band that includes a first set of frequencies configured for receptions at a communication device (e.g., the network entity 205, the UEs 215) and a second set of frequencies that is paired with the first set of frequencies and configured for transmissions at the communication device. In some examples of paired operating bands, the first set of frequencies (e.g., a first band, a first operating band, a first carrier) and the second set of frequencies (e.g., a second band, a second operating band, a second carrier) may be non-overlapping in frequency. For example, the first set of frequencies and the second set of frequencies may be non-overlapping in frequency, or have a frequency range or set of subcarriers between (e.g., separating) the two sets of frequencies. Additionally, or alternatively, as described herein, an unpaired operating band may refer to a set of frequencies (e.g., a range of frequencies that may be referred to as a band, an operating band, or a carrier) that may be used for both transmissions and receptions at the communication device.

In some examples, the wireless communications system 200 may support one or more duplex enhancements at the network entity 205 (e.g., at the gNB side) and half duplex operation at the UEs 215 (e.g., at the UE side). For example, the network entity 205 may support subband non-overlapping full duplex in a TDD carrier and one or more potential enhancements associated with dynamic TDD, which may also be referred to as flexible TDD. That is, the network entity 205 may support subband non-overlapping full duplex and one or more potential enhancements for dynamic TDD. As described herein, dynamic TDD may refer to TDD operations in which a transmission direction associated with time domain resources may be assigned or reassigned dynamically. For example, the time domain resources may be dynamically assigned or reassigned for uplink communications (e.g., an uplink transmission direction) or downlink communications (e.g., a downlink transmission direction). In such examples, one or more frequency ranges used for wireless communications between the network entity 205 and the UEs 215 may be unconstrained. For example, the wireless communications system 200 may support one or more deployment scenarios for one or more duplex enhancements. In some examples, such deployment scenarios may be evaluated (e.g., using one or more evaluation methodologies).

In some examples, dynamic TDD may lead to interference between networks operating on adjacent channels (e.g., inter-operator interference). In some examples, interference between adjacent channel networks may not be coordinated. In such examples, interference may be mitigated at a communications device (e.g., the network entity 205, the UEs 215). For example, the network entity 205 may support one or more potential schemes to support subband non-overlapping full duplex and one or more potential enhancements on dynamic TDD. In some examples, the one or more potential schemes may include one or more schemes for managing (e.g., mitigating, handling) inter-network entity (e.g., inter-gNB) and inter-UE cross-link interference (CLI). As described herein, CLI may refer to interference experienced at a communication device (e.g., the network entity 205, the UEs 215) if a reception at the communication device overlaps (e.g., in a time domain) with a transmission at another (e.g., neighboring) communication device. Additionally, or alternatively, the network entity 205 may support one or more schemes for managing intra-subband CLI and inter-subband CLI (e.g., for subband non-overlapping full duplex). As described herein, intra-subband CLI may refer to CLI in which the interfering transmission and reception occur using multiple (e.g., different) subbands. Additionally, or alternatively, inter-subband CLI may refer to CLI in which the interfering transmission a reception occur using a same subband. In some examples, the network entity 205 may support one or more operations to enable the schemes for managing CLI (e.g., intra-subband CLI and inter-subband CLI). For example, the network entity 205 may support one or more operations pertaining to the co-existence of uplink subbands and downlink subbands in co-channels and adjacent channels.

In some examples, adjacent-channel co-existence may lead to one or more radio frequency constraints, such as due to self-interference, inter-subband CLI, and inter-operator CLI at the network entity 205 (e.g., a gNB). Additionally, or alternatively, adjacent-channel co-existence may lead to one or more radio frequency constraints due to inter-subband CLI and inter-operator CLI at the UEs 215. As described herein, self-interference may refer to interference experienced at a communication device (e.g., the network entity 205, a device capable of supporting full duplex operations) that may result from signal leakage between an antenna panel used at the communication device for transmissions and another antenna panel used at the communication device for receptions. Additionally, or alternatively, as described herein, inter-operator CLI may refer to interference experienced at a communication device (e.g., the network entity 205, the UEs 215) due to transmissions from another communication device (e.g., a neighboring network entity, a neighboring UE) that may be operating in another communication network. In some examples, the communication device may support one or more antenna, radio frequency, and algorithm designs to mitigate one or multiple types of CLI. For example, the communication device may support antenna isolation, transmission interference measurement suppression (e.g., for receptions), filtering, and digital interference suppression, among other possible examples. In such examples, the wireless communications system 200 may support one or more aspects for deploying duplex enhancements for TDD (e.g., using the unpaired spectrum).

As illustrated in the example of FIG. 2, the network entity 205 may support multiple user MIMO (MU-MIMO) communications with the UEs 215. For example, the network entity 205 may support downlink MU-MIMO in which the network entity may transmit downlink communications to the UE 215-a and the UE 215-b simultaneously. Additionally, or alternatively, the network entity 205 may support uplink MU-MIMO in which the network entity may receive uplink communications to the UE 215-a and the UE 215-b simultaneously. In some examples, the network entity 205 may support downlink and uplink MU-MIMO using full duplex operations. For example, the network entity 205 may support full duplex operations in which the network entity 205 may receive uplink communications from the UE 215-a and transmit downlink communications to the UE 215-b simultaneously. The network entity 205 may use multiple beams (e.g., generated using one or more antenna panels) to support simultaneous communications with the UEs 215. For example, the network entity 205 may use a first antenna panel to generate a beam 210-a for reception of the uplink communications from the UE 215-a and a second antenna panel to generate a beam 210-b for transmission of the downlink communications to the UE 215-b. In some examples, while full duplex communications at the network entity 205 may be spatially isolated (e.g., due to the use of different beam for downlink transmissions and uplink receptions at the network entity 205), the network entity 205 may experience self-interference 235. For example, the network entity 205 may experience the self-interference 235 due to signal leakage between the second antenna panel used for downlink transmissions to the UE 215-b and the first antenna panel used for uplink receptions from the UE 215-a. Additionally, or alternatively, the network entity 205 may experience clutter interference, for example due to a presence of a reflector in an environment of the network entity 205. As described herein, clutter interference may refer to interference due to a portion of a signal transmitted from the network entity 205 being reflected back to the network entity 205 from a reflector (e.g., a reflective surface).

In some examples, to reduce the self-interference 235 experienced at the network entity 205 (e.g., due to the full duplex communications), the network entity 205 may use multiple (e.g., different) subbands for uplink receptions and downlink transmissions at the network entity 205. For example, the network entity 205 may support SBFD operations in which the network entity may use one or more subbands (e.g., an uplink subband, a flexible subband) for uplink receptions from the UE 215-a and one or more other subbands (e.g., a downlink subband, the flexible subband) for downlink transmissions to the UE 215-b. That is, the network entity 205 may support simultaneous transmission and reception of downlink and uplink communications, respectively, on a subband basis. For example, the network entity 205 may support SBFD operations in which the network entity 205 may using a same TTI (e.g., a same slot or a same symbol) to simultaneously receive uplink communications from the UE 215-a using one or more uplink subbands (or one or more flexible subbands) and transmit downlink communications to the UE 215-b using one or more downlink subbands (or the one or more flexible subbands). In some examples, the network entity 205 may use SBFD to achieve spatial isolation (e.g., using different beams) and frequency isolation (e.g., using different subbands) to reduce the self-interference 235. Additionally, or alternatively, in some examples, SBFD operations may provide for an increased uplink duty cycle, which may lead to a latency reduction. For example, the network entity 205 may be configured to transmit one or more downlink signals in TTIs (e.g., slots) configured for uplink communications, which may enable a latency reduction and one or more uplink coverage improvements. Additionally, or alternatively, SBFD operations may provide for enhanced system capacity, increased resource utilization, and increased spectrum efficiency, among other possible benefits. In some examples, enabling flexible and dynamic uplink and downlink resource adaption (e.g., based on uplink or downlink traffic conditions) may lead to increased reliability of communications between the UEs 215 and the network entity 205.

In some examples, while the network entity 205 may be configured to support SBFD operations, the network entity 205 and the UEs 215 may be configured with one or more multiplexing rules that may be based on (e.g., may assume) half duplex operations at the network entity 205. For example, within a TDD carrier, the network entity 205 and the UEs 215 may be configured with one or more multiplexing rules in which a TTI may be used for transmissions or receptions. That is, the network entity 205 and the UEs 215 may be configured to perform downlink channel and uplink channel (or downlink reference signal and uplink reference signal) prioritization and multiplexing in accordance with one or more rules for half duplex operations. In some examples, the one or more rules for half duplex operations may indicate that synchronization signal block (SSB) transmissions from the network entity 205 may be prioritized over (e.g., may cancel) an uplink transmission from the UEs 215. That is, the UEs 215 may be configured to prioritize the reception of an SSB from the network entity 205 over the transmission of an uplink signal to the network entity 205. For example, at the UEs 215, SSB reception may be prioritized over the transmission of physical uplink shared channel (PUSCH) signals, physical uplink control channel (PUCCH) signals, random access preambles (e.g., physical random access channel (PRACH) signals), and sounding reference signals (SRS), among other examples of uplink signals. In some examples, a TTI may be configured (e.g., at the UEs 215) for uplink communications or downlink communications using a slot format indicator (SFI). For example, the network entity 205 may signal (e.g., dynamically) an allocation of resources for one or multiple TTIs using an SFI. In some examples, the SFI may configure the allocated resources as downlink resource, uplink resources, or flexible resources. In some instances, resources configured as flexible may be overwritten (e.g., reassigned as uplink or downlink). For example, the network entity 205 may transmit, to one or both of the UEs 215, an SFI for uplink (SFI-U), which may indicate uplink resources for uplink communications during a TTI. In such an example, in accordance with the one or more rules for half duplex operations, the UEs 215 may refrain from monitoring for (e.g., may not be expected to receive) an SFI-U for a TTI that may be configured for the reception of SSBs.

Additionally, or alternatively, the network entity 205 may transmit, to the UEs 215, an SFI for downlink (SFI-D), which may indicate downlink resources for downlink communications during a TTI. In some examples, in accordance with the one or more rules for half duplex operations, the UEs 215 may refrain from monitoring for (e.g., may not be expected to receive) an SFI-D for a TTI that may include (e.g., be configured with) one or more random access occasions (e.g., a valid random access occasion) for transmission of a random access preamble. In some examples, the one or more rules for half duplex may indicate that the UEs 215 may refrain from monitoring for (e.g., may not expect to receive) an SFI-U for a TTI that may be configured (e.g., using a an RRC configuration transmitting using a master information block (MIB)) with one or more control resources sets (CORESETs), such as a CORESET 0. Additionally, or alternatively, in accordance with the one or more rules for half duplex, the UEs 215 may refrain from monitoring for (e.g., may not expect to receive) an SFI-U for a TTI that may be configured for downlink communications (e.g., using an RRC configuration). For example, the UEs 215 may receive an indication of one or more RRC parameters (e.g., a TDD-UL-DL-ConfigCommon information element (IE), a TDD-UL-DL-ConfigDedicated IE) that may identify an uplink and downlink TDD configuration (e.g., a UE-specific configuration) for one or more TTIs. That is, the one or more RRC parameters may configure one or more TTIs for downlink communications or uplink communications at the UEs 215. In some examples, in accordance with the one or more rules for half duplex, downlink communications configured using an RRC configuration may be prioritized over uplink communications, such as the transmission of a PUCCH signal, a PUCCH signal, a random access preamble (e.g., a PRACH), or an SRS. Additionally, or alternatively, in accordance with the one or more rules for half duplex, uplink communications configured using an RRC configuration may be prioritized over downlink communications, including monitoring of the PDCCH (e.g., using a CORESET) and reception of a PDSCH signal, channel state information reference signal (CSI-RS), or a positioning reference signal (PRS) (e.g., in the absence of a measurement gap). For example, in accordance with the one or more rules for half duplex, the UEs 215 may refrain from monitoring for (e.g., may not expect to receive) an SFI-D for a TTI that may be configured for uplink communications (e.g., using an RRC configuration). It is to be understood that the names of IEs described herein may change based on implementation of one or more devices (e.g., the UEs 215, the network entity 205), and the examples described herein should not be considered limiting to the scope covered by the claims or the disclosure.

In some examples, the network entity 205 may use RRC signaling (e.g., the TDD-UL-DL-ConfigCommon IE, the TDD-UL-DL-ConfigDedicated IE) to configure the UEs 215 with flexible TTIs. In such an example, a previous resource allocation (e.g., a previous uplink resource allocation or a previous downlink resource allocation) may be overwritten. For example, an RRC configuration for a flexible TTI may overwrite a previous higher layer configuration (e.g., a previous RRC configuration) for the TTI, such as a higher layer configuration for periodic (or semi-persistent) downlink communications or periodic (or semi-persistent) uplink communications. Additionally, or alternatively, in some examples, the network entity 205 may transmit an SFI to dynamically configure flexible TTIs for uplink communication or downlink communication. In some examples, however, the UEs 215 may fail to detect an SFI. In such examples, the one or more rules for half duplex may indicate that periodic (or semi-persistent) downlink communications and uplink communications previously configured for the flexible TTIs may be canceled. That is, if the UEs 215 fails to detect an SFI for a TTI, the flexible RRC configuration may be prioritized over periodic or semi-persistent communications configured during the TTI, such as higher layer configured downlink communications (e.g., reception of a CSI-RS or a PRS) and higher layer configured uplink communications (e.g., transmission of PUSCH signals, PUCCH signals, PRACH signals, and SRS signals in the absence of an EnableConfiguredUL-r16 IE).

In some examples, the network entity 205 may use an SFI, which may indicate resources for either downlink communications or uplink communications during a TTI. For example, the network entity 205 may transmit an SFI for flexible communications (SFI-F) to the UEs 215, which may configure one or more TTIs as flexible. In some examples, the one or more TTIs may be previously configured (e.g., using an RRC configuration, such as the tdd-UL-DL-configurationCommon IE) for downlink or uplink communications. In such examples, the SFI-F may overwrite the previous configuration. In some examples, the one or more rules for half duplex may indicate, that the UEs 215 may refrain from monitoring for (e.g., may not expect to receive) a dynamic grant (e.g., downlink control information (DCI)) indicating downlink resources for downlink communications (e.g., reception of a PDSCH signal or a CSI-RS) during a TTI that may be configured for uplink communications using an SFI (e.g., an SFI-U). Additionally, or alternatively, the UEs 215 may refrain from monitoring for (e.g., may not expect to receive) a dynamic grant (e.g., DCI) indicating uplink resources for uplink communications (e.g., a PUSCH signal, a PUCCH signal, a PRACH signal, a SRS) during a TTI that may be configured for downlink communications using an SFI (e.g., an SFI-D). In some examples, however, in accordance with the one or more rules for half duplex operations, an SFI may be used to overwrite communications (e.g., periodic or semi-persistent transmission of uplink signals or downlink signals) configured using higher layer configurations (e.g., RRC configurations). For example, in accordance with the one or more rules for half duplex operations, an SFI-F or an SFI-D may be prioritized over higher layer configured uplink communications (e.g., transmission of a PUSCH signal, a PUCCH signal, a PRACH, an SRS). Additionally, or alternatively, an SFI-F or an SFI-U may be prioritized over higher layer configured downlink communications (e.g., monitoring of a CORESET, transmission of signals configured using semi-persistent scheduling (SPS), transmission of a CSI-RS).

In some examples, in accordance with the one or more rules for half duplex, the UEs 215 may be configured to prioritize uplink dynamic grants (e.g., DCI) that indicate uplink resources for uplink communications during a TTI over downlink communications (e.g., reception of a PDCCH signal, SPS, CSI-RS, or PRS) that may be configured during the TTI using higher layer signaling (e.g., an RRC configuration). Additionally, or alternatively, the UEs 215 may be configured to prioritize downlink dynamic grants (e.g., DCI) that indicate downlink resources for downlink communications during a TTI over uplink communications (e.g., transmission of a PUSCH signal, PUCCH signal, PRACH, or SRS) that may be configured during the TTI using higher layer signaling (e.g., an RRC configuration). In some examples, the one or more rules for half duplex operations may apply to downlink communications and uplink communications configured for different component carriers of a same radio frequency spectrum band.

In some examples, however, the one or more rules for half duplex may lead to unnecessary increases in latency. For example, the network entity 205 may be configured for SBFD operations, in which the network entity may simultaneously use one or more uplink subbands (or flexible subbands) of a SBFD TTI (e.g., a slot or symbol configured for SBFD communications) for uplink communications with a UE (e.g., the UE 215-a) and one or more downlink subbands (or the flexible subbands) of the same SBFD TTI for downlink communications with another UE (e.g., the UE 215-b). In such examples, the downlink channel and uplink channel (or downlink reference signal and uplink reference signal) multiplexing constraints imposed by the one or more rules for half duplex may lead to reduced resource utilization and unnecessary increases in latency. As such, the one or more rules for half duplex operations may be modified (or lifted) for SBFD communications, such that the UEs 215 may receive uplink configurations and downlink configurations for a same TTI. That is, multiple configurations may be enabled for UE relaying, or SBFD operations (or other full duplex operations or modes) at the network entity 205, such that the network entity 205 may perform simultaneous uplink and downlink communications in a SBFD TTI (e.g., a SBFD symbol or slot). In such an example, in accordance with one or more modified rules (or in the absence of the one or more rules for half-duplex) the UE 215-b may receive an uplink configuration for uplink transmissions during a TTI and receive a downlink configuration for downlink receptions during the TTI. Additionally, in such an example, the network entity 205 may configure the UEs 215 (or the UEs 215 may be otherwise configured) with one or more other rules, such as prioritization rules 245, to use for the SBFD operations (or other full-duplex operations at the network entity 205). For example, the UE 21-b may use the prioritization rules 245 to determine whether to transmit in accordance with the uplink configuration during the TTI or receive in accordance with the downlink configuration during the TTI.

As illustrated in the example of FIG. 2, the network entity 205 may indicate, to the UE 215-b, downlink resources 265 for downlink communications during one or more TTIs (e.g., a TTI 240-a, a TTI 240-b, and a TTI 240-c) and uplink resources 260 for uplink communications during one or more other TTIs (e.g., a TTI 240-d and a TTI 240-e). In some examples, the network entity 205 may use an RRC configuration, such as via the TDD-UL-DL-ConfigCommon IE or the TDD-UL-DL-ConfigDedicated IE, to indicate the downlink resources 265 for downlink communications and the uplink resources 260 for uplink communications. Additionally, or alternatively, the network entity 205 may indicate (e.g., further indicate), to the UE 215-b, one or more of the TTIs (e.g., a subset of the TTIs configured with the downlink resources 265) that may be used for SBFD operations. For example, the network entity 205 may transmit a control message 225 to the UE 215, which may identify one or more TTIs 240 to be used for SBFD communications between the UE 215-b and the network entity 205. For example, the control message 225 may configure the TTI 240-a, the TTI 240-b, and the TTI 240-c for SBFD operations. In such an example, the control message 225 may indicate a frequency location of a downlink subband 255-a and a downlink subband 255-b, which may be used at the UE 215-b (or the UE 215-a) for downlink communications. Additionally, or alternatively, the control message 225 may indicate a frequency location of an uplink subband 250, which the UE 215-b (or the UE 215-a) may use for uplink communications. For example, during a TTI configured for SBFD communications, the UE 215-a may use the uplink subband 250 for uplink communications with the network entity 205 and the UE 215-b may use one or more of the downlink subbands 255 for downlink communications with the network entity 205. In some examples, a portion of the TTI may be configure for SBFD. For example, the TTI 240-a may correspond to a slot or a symbol (or some other suitable duration). In such an example, the control message 225 may indicate that the TTI 240-a or a portion of the TTI 240-a (e.g., one or more symbols within a slot) may be used for SBFD. That is, the control message 225 may indicate a time and frequency location for the downlink subbands 255 and the uplink subband 250. Additionally, or alternatively, the control message 225 may indicate a time and frequency location of a guard band or a flexible subband that may be configured for SBFD. In some examples, the control message 225 may be indicative of TDD operations at the UE 215-b. For example, the control message 225 may correspond to a TDD configuration, which the network entity 205 may transmit using RRC signaling. The RRC signaling may include the TDD-UL-DL-ConfigCommon IE or the TDD-UL-DL-ConfigDedicated IE. Additionally, or alternatively, the network entity 205 may transmit the control message 225 using broadcast signaling.

In such examples, the UE 215-b (e.g., and the UE 215-a) may be capable of receiving downlink configurations and uplink configurations for the TTIs 240 (e.g., TTIs configured for SBFD communications). For example, the UE 215-b may receive a first indication 230 of the uplink resources 260 to be used for uplink communications during the TTI 240-a and a second indication 231 of the downlink resources 265 for downlink communications during the TTI 240-a. In such an example, the UE 215-b may use the prioritization rules 245 to determine whether to communicate in accordance with the first indication 230 or the second indication 231 during the TTI 240-a. That is, the UE 215-b may communicate, during the TTI 240-a, in accordance with one of the first indication 230 or the second indication 231 based on the prioritization rules 245. For example, based on the prioritization rules 245, the UE 215-b may receive a downlink signal using one or more of the downlink subbands 255 during the TTI 240-a or transmit an uplink signal using the uplink subband 250 during the TTI 240-a.

In some examples, the UE 215-b may receive an indication of the downlink resources 265 in one or more of the downlink subbands 255 to be used for reception of SSBs (e.g., from the network entity 205) during the TTI 240-a. Additionally, or alternatively, the UE 215-b may receive an indication of the uplink resources 260 in the uplink subband 250 to be used for uplink communications (e.g., periodic uplink transmissions) during the TTI 240-a. That is, SSBs transmitted from the network entity 205 may overlap with a TTI configured for uplink communications using an SFI-U. For example, the first indication 230 may be for transmission of an uplink signal within the uplink subband 250 during the TTI 240-a. In some examples, the first indication 230 may including an SFI-U pertaining to the TTI 240-a. Additionally, or alternatively, the second indication 231 may be for reception of an SSB within one or more of the downlink subbands 255 during the TTI 240-a. For example, the UE 215-b may be configured for the reception of SSBs using one or more of the downlink subbands 255 during the TTI 240-a (e.g., a SBFD symbol) and may also be configured with an uplink transmission (e.g., transmission of a PUSCH signal, a PUCCH signal, a PRACH, or SRS) using the uplink subband 250 of the TTI 240-*a* (e.g., the same SBFD symbol).

Additionally, or alternatively, the UE 215-*b* may receive an indication of a random access occasion (e.g., a valid random access occasion) in the uplink subband 250 during the TTI 240-*a* (e.g., a SBFD symbol) that may also be configured for downlink communications using an SFI-D. That is, the first indication 230 may be for transmission of a random access preamble within the uplink subband 250 during the TTI 240-*a* and the second indication 231 may be for reception of a downlink signal within one or more of the downlink subbands 255 during the TTI 240-*a*. In such an example, the second indication 231 may include SFI-D pertaining to the TTI 240-*a*.

In some examples, the UE 215-*b* may receive a MIB (e.g., from the network entity 205) that may identify a CORESET (e.g., a CORESET 0) in one or more of the downlink subbands 255 during the TTI 240-*a* that may be configured for uplink communications using an SFI-U. For example, the network entity 205 may use an SFI-U to indicate the uplink resources 260 in the uplink subband 250 to be used for uplink communications during the TTI 240-*a*. That is, the first indication 230 may be for transmission of an uplink signal within the uplink subband 250 during the TTI 240-*a* and the second indication 231 may be for monitoring a downlink control channel (e.g., a CORESET) within one or more of the downlink subbands 255 during the TTI 240-*a*. In such an example, the first indication 230 may include an SFI-U pertaining to the TTI 240-*a*.

In some examples, the first indication 230 may be for transmission of an uplink signal within the uplink subband 250 during the TTI 240-*a*. In such examples, the first indication 230 may include an SFI-U, an SFI-F, an RRC configuration or a dynamic grant pertaining to the TTI 240-*a*. Additionally, or alternatively, the second indication 231 may be for reception of a downlink signal within one or more of the downlink subbands 255 during the TTI 240-*a*. In such examples, the second indication 231 may include an SFI-D, an SFI-F, an RRC configuration, or a dynamic grant pertaining to the TTI 240-*a*. For example, the UE 215-*b* may receive an RRC configuration that may indicate downlink resources for downlink communications using one or more of the downlink subbands 255 during the TTI 240-*a* (e.g., a SBFD symbol) that may be overlapping with uplink communications (e.g., transmission of a PUCCH signal, a PUCCH signal, a PRACH, or a SRS) configured in the uplink subband 250 during the TTI 240-*a* (e.g., during the same SBFD symbol). That is, the second indication 231 may include a downlink RRC configuration that may be indicated to the UE 215-*b* with an SFI-U. In such examples, the prioritization rules 245 may include a rules that indicates that the TTI 240-*a* may be used for the uplink communications (e.g., the uplink communications may be prioritized over the downlink communications). In some examples, such a rule may be used at the network entity 205 to dynamically overwrite a previously configured communication (e.g., may be used for dynamic overwrite).

Additionally, or alternatively, the UE 215-*b* may receive an RRC configuration that may indicate the uplink resources 260 for uplink communications using the uplink subbands 250 during the TTI 240-*a* (e.g., a SBFD symbol) that may be overlapping with downlink communications (e.g., monitoring of a CORESET or transmission of a PDSCH signal, a CSI-RS, or a PRS in the absence of a measurement gap) configured in one or more of the downlink subbands 255 during the TTI 240-*a* (e.g., during the same SBFD symbol).

That is, the first indication 230 may include an uplink RRC configuration that may be indicated, to the UE 215-*b*, with an SFI-D. In such examples, the prioritization rules 245 may include a rule that indicates that the TTI 240-*a* may be used for the downlink communications (e.g., the downlink communications may be prioritized over the uplink communications). In some examples, such a rule may be used at the network entity 205 to dynamically overwrite a previously configured communication (e.g., may be used for dynamic overwrite).

In some examples, such as for flexible TTIs, the UE 215-*b* may fail to detect an SFI. In such examples, the UE 215 may be configured with periodic (or semi-persistent) downlink communications and uplink communications for the flexible TTIs. For example, if the UE 215-*b* fails to detect an SFI for the TTI 240-*a*, the UE 215-*b* may receive a flexible RRC configuration for downlink communications (e.g., with SPS or for transmission of a CSI-RS or PRS) using one or more of the downlink subbands 255 during the TTI 240-*a* that may be overlapping (e.g., in time) with the uplink subband 250. In such an example, the uplink subband 250 may be configured for uplink communications (e.g., transmission of a PUSCH signal, a PUCCH signal, a PRACH, or an SRS) during the TTI 240-*a* (e.g., the same SBFD symbol). That is, the second indication 231 may include a flexible RRC configuration for downlink communications during the TTI 240-*a*.

In some examples, the first indication 230 may include an SFI-U and the second indication 231 may include a downlink dynamic grant. That is, the UE 215-*b* may receive an SFI-U pertaining to the TTI 240-*a* and a downlink dynamic grant (e.g., DCI) for transmission of a PDSCH signal or CSI-RS in one or more of the downlink subbands 255 during the TTI 240-*a*. Additionally, or alternatively, the second indication 231 may include an SFI-D and the first indication 230 may include an uplink dynamic grant. That is, the UE 215-*b* may receive an SFI-D pertaining to the TTI 240-*a* and an uplink dynamic grant (e.g., DCI) for transmission of a PUSCH signal, a PUCCH signal, a PRACH, or an SRS in the uplink subband 250 during the TTI 240-*a*. In some examples, the UE 215-*b* may receive an SFI-F or SFI-D pertaining to the TTI 240 and be configured (e.g., via RRC signaling) for transmission of a PUSCH signal, a PUCCH signal, a PRACH, or an SRS in the uplink subband 250 of the TTI 240-*a*. Additionally, or alternatively, the UE 215-*b* may receive an SFI-F or SFI-U pertaining to the TTI 240 and be configured (e.g., via RRC signaling) for monitoring a CORESET for downlink signals, receiving signals scheduled using SPS, or receiving CSI-RS in one or more of the downlink subbands 255 during the TTI 240-*a*.

In some examples, the first indication 230 may include an uplink dynamic grant (e.g., DCI). That is, the UE 215-*b* may receive an uplink dynamic grant for uplink transmissions using the uplink subband 250 during the TTI 240-*a*. Additionally, the UE 215-*b* may be configured (e.g., using RRC signaling) with downlink communications (e.g., transmission of signals configured using SPS, transmission of a PDCCH signal, a CSI-RS, a PRS) in one or more of the downlink subbands 255 using the TTI 240-*a*. Additionally, or alternatively, the second indication 231 may include a downlink dynamic grant (e.g., DCI). That is, the UE 215-*b* may receive a downlink dynamic grant for downlink receptions using one or more of the downlink subband 255 during the TTI 240-*a*. Additionally, or alternatively, the UE 215-*b* may be configured (e.g., using RRC signaling) with uplink communications (e.g., transmission of a PUSCH signal, a PUCCH signal, a PRACH, or a SRS) in the uplink subband 250 using the TTI 240-*a*. In some examples, the first indication 230 may be for a first component carrier of a radio frequency spectrum band and the second indication 231 may be for a second component carrier of the radio frequency spectrum band that may be different from the first component carrier. In some examples, enabling the UEs 215 to receive uplink and downlink configurations for a same TTI may enable flexible and dynamic uplink and downlink resource adaption (e.g., according to uplink and downlink traffic conditions), among other possible benefits.

Figure 3A:
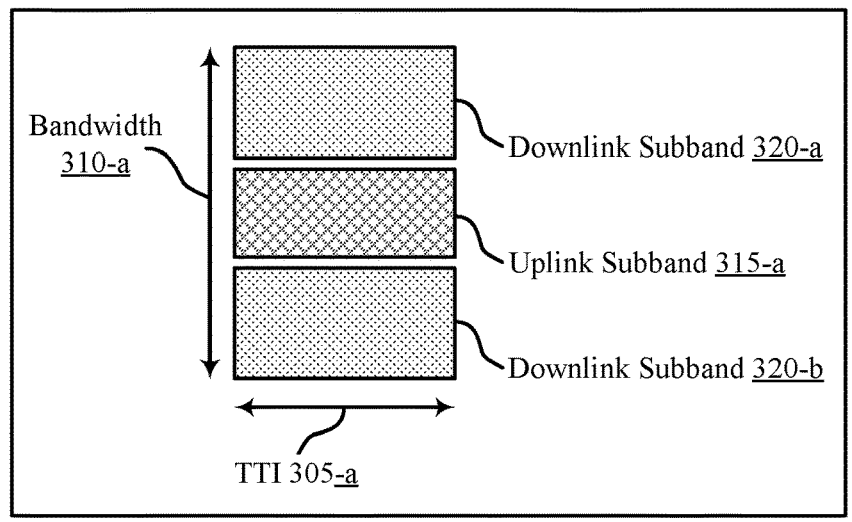
FIGS. 3A and 3B illustrate examples of a SBFD configuration that supports multiplexing rules for SBFD communications in accordance with one or more aspects of the present disclosure.
Figure 3B:
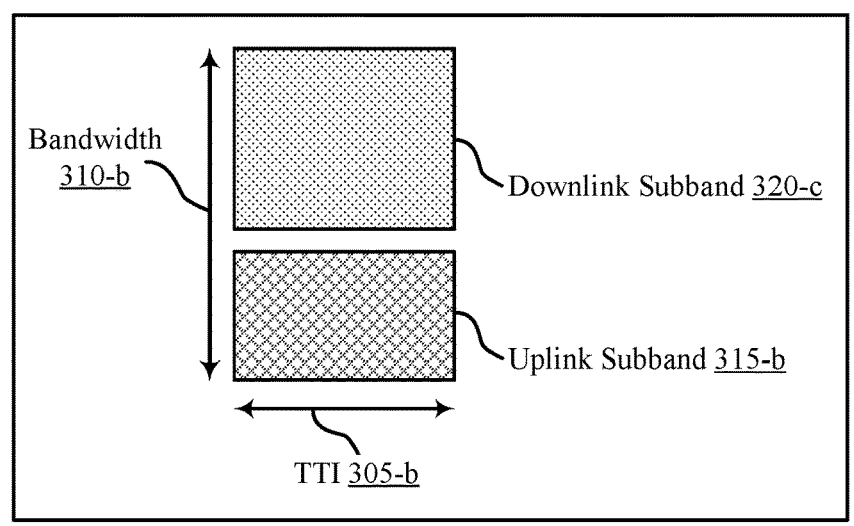

FIGS. 3A and 3B illustrate examples of an SBFD configuration 300 that supports multiplexing rules for SBFD communications in accordance with one or more aspects of the present disclosure. The SBFD configurations 300 (e.g., a SBFD configuration 300-*a* and a SBFD configuration 300-*b*) may be implemented at one or more aspects of the wireless communications system 100 and the wireless communications system 200. For example, the SBFD configurations 300 may be implemented at a network entity or a UE, or booth, which may be examples of the corresponding devices as discussed with reference to FIGS. 1 and 2. The SBFD configurations 300 may include features for improved communications between the network entity and the UE, among other possible benefits.

In some examples, the network entity (e.g., a gNB) may support SBFD or another full duplex mode using a SBFD slot or symbol, which may be referred to as a TTI. That is, the network entity (e.g., a gNB) may receive uplink communications while transmitting downlink communications. In such examples, to reduce overhead, the network entity and the UE may support the SBFD configurations 300, which may provide for a configured downlink opportunity and a configured uplink opportunity to coexist on a TTI (e.g., a same symbol). As illustrated in the example of FIG. 3A, the SBFD configuration 300-*a* may provide for an uplink opportunity using an uplink subband 315-*a* and a downlink opportunity using a downlink subband 320-*a* or a downlink subband 320-*b*, or both. That is, the UE may receive an indication of uplink resources 325 for transmission of an uplink signal using the uplink subband 315-*a* during a TTI 305-*a* and downlink resources 330 for reception of a downlink signal using one or both of the downlink subband 320-*a* and the downlink subband 320-*b* during the TTI 305-*a*. The uplink subband 315-*a*, the downlink subband 320-*a*, and the downlink subband 320-*b* may correspond to different component carriers within a same radio frequency spectrum band (e.g., within a bandwidth 310-*a*).

Additionally, or alternatively, as illustrated in the example of FIG. 3B, the SBFD configuration 300-*b* may provide for an uplink opportunity using an uplink subband 315-*b* and a downlink opportunity using a downlink subband 320-*c*. That is, the UE may receive an indication of the uplink resources 325 for transmission of an uplink signal using the uplink subband 315-*b* during a TTI 305-*b* and the downlink resources 330 for reception of a downlink signal using the downlink subband 320-*c* during the TTI 305-*b*. The uplink subband 315-*b* and the downlink subband 320-*c* may correspond to different component carriers within a same radio frequency spectrum band (e.g., within a bandwidth 310-*b*).

As illustrated in the example of FIG. 3A, a configured uplink opportunity (e.g., the uplink resources 325) in the uplink subband 315-*a* may coexist with a downlink opportunity (e.g., the downlink resources 330) in the downlink subband 320-*a* and the downlink subband 320-*b* of the TTI 305-*a*. In some examples, the TTI 305-*a* (e.g., a SBFD symbol) may be configured for downlink communications using an SFI-D. For example, the UE may receive an RRC configuration indicating the uplink resources 325 for transmission of an uplink signal using the uplink subband 315-*a* during the TTI 305-*a* and may receive an SFI-D pertaining to the TTI 305-*a*. In such an example, the UE may use one or more prioritization rules to determine whether to receive a downlink signal during the TTI 305-*a* in accordance with the SFI-D (e.g., a downlink dynamic grant) or transmit the uplink signal during the TTI 305-*a* in accordance with the RRC configuration. For example, a beam failure recovery procedure may fail to be triggered at the UE. In such an example, in accordance with the one or more prioritization rules, the UE may determine to communication with the network entity in accordance with the SFI-D during the TTI 305-*a*. For example, the UE may use the SFI-D for reception of a downlink signal during the TTI 305-*a*. In some examples, the downlink signal may include a PDSCH signal, an SPS signal, or a CSI-RS, which may be indicated to the UE using a dynamic grant. In some other examples, a beam failure recovery may be triggered at the UE. In such examples, the UE may refrain from receiving (e.g., may drop) the downlink signal and may transmit the uplink signal (e.g., an SRS or PRACH) for the triggered beam failure recovery procedure during the TTI 305-*a* (e.g., on the TTI configured using SFI-D).

Additionally, or alternatively, a configured downlink opportunity (e.g., the downlink resources 330) in one or both of the downlink subband 320-*a* and the downlink subband 320-*b* during the TTI 305-*a* may coexist with an uplink opportunity (e.g., the uplink resources 325) in the uplink subband 315-*a* of the TTI 305-*a*. For example, the UE may receive an RRC configuration identifying flexible resources (e.g., a flexible symbol) for transmission of an uplink signal or reception of a downlink signal during the TTI 305-*a* (e.g., in the absence of a slot format provided using an SFI). In such an example, the configured downlink opportunity (e.g., the downlink resources 330) in one or both of the downlink subband 320-*a* and the downlink subband 320-*b* during the TTI 305-*a* may coexist with the uplink opportunity (e.g., the uplink resources 325) in the uplink subband 315-*a* during the TTI 305-*a*. In such examples, if the beam failure recovery procedure fails to be triggered at the UE, the UE may determine use (e.g., in accordance with the one or more prioritization rules) the RRC configuration for flexible communications during the TTI 305-*a*. For example, the UE may determine to receive the configured downlink signal (e.g., an SPS signal or a CSI-RS). Additionally, or alternatively, if the beam failure recover procedure is triggered at the UE, the UE may determine to refrain from receiving (e.g., may drop) the downlink signal and may transmit the uplink signal (e.g., an SRS signal or a PRACH) for beam failure recovery using the TTI 305-*a*. That is, the one or more prioritization rules may include that reception of a downlink signal using the downlink subband 320-*a* or the downlink subband 320-*b* (or both) may be prioritized over transmission of an uplink signal using the uplink subband 315-*a* during the TTI 305-*a* in the absence of a beam failure recovery procedure being triggered. Additionally, or alternatively, the prioritization rules may include that transmission of an uplink signal may be prioritized over reception of a downlink signal during the TTI 305-*a* in the presence of a beam failure recovery procedure being triggered. In some examples, the prioritization rules may be based on a priority or type of communication channel associated with a communication channel to be used for transmission of the uplink signal and another communication channel to be used for reception of the downlink signal. Additionally, or alternatively, the prioritization rules may be based on one or more other suitable types of rules. In some examples, using the prioritization rules to determine whether to receive the downlink signal or transmit the uplink signal during the TTI 305-*a* may lead to increased resource utilization and reduced latency, among other possible benefits.

Figure 4:
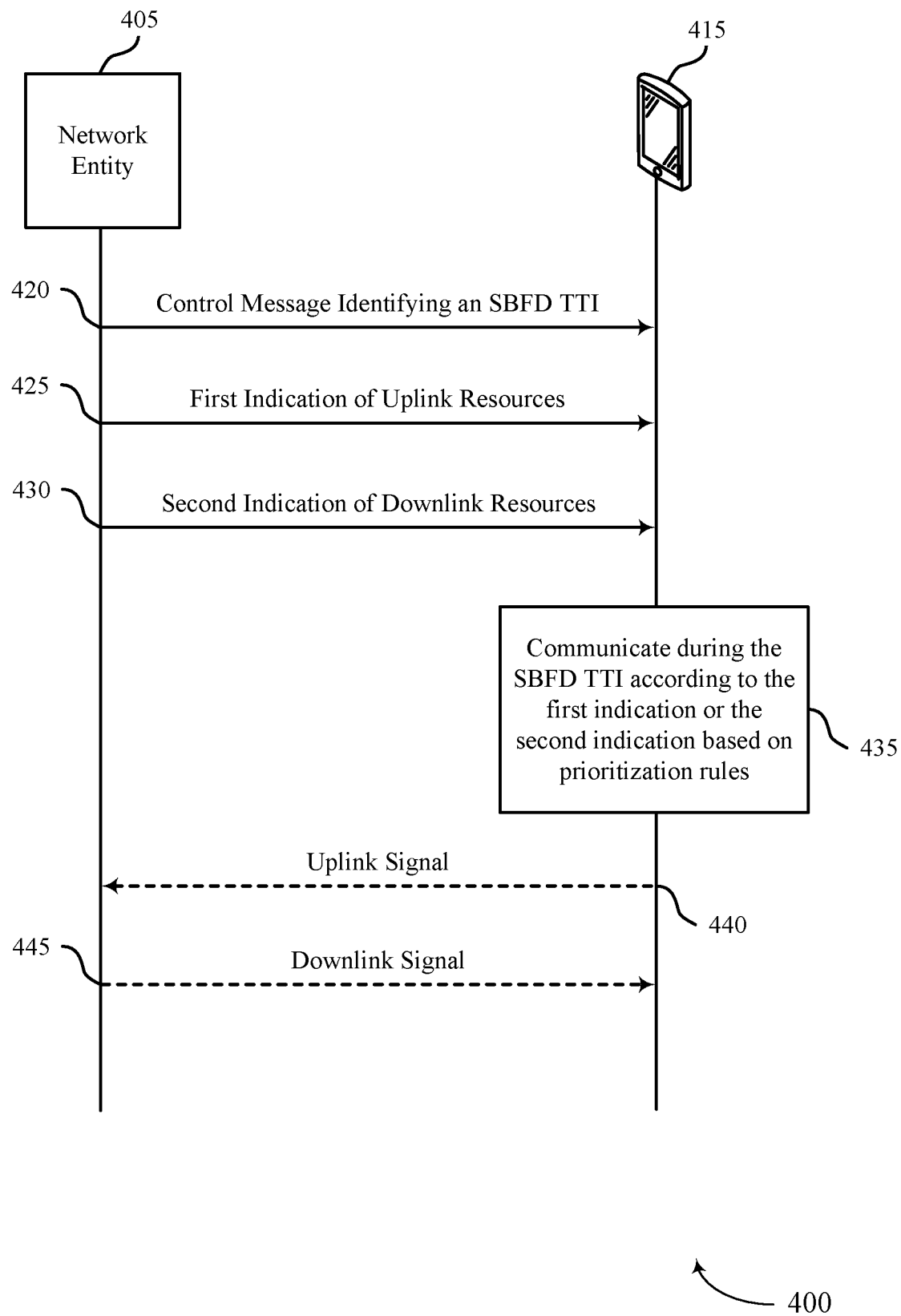
FIG. 4 illustrates an example of a process flow that supports multiplexing rules for SBFD communications in accordance with one or more aspects of the present disclosure.

FIG. 4 illustrates an example of a process flow 400 that supports multiplexing rules for SBFD communications in accordance with one or more aspects of the present disclosure. In some examples, the process flow 400 may implement one or more aspects of the wireless communications system 100, the wireless communications system 200, and the SBFD configurations 300. For example, the process flow 400 may include example operations associated a network entity 405 and a UE 415, which may be examples of the corresponding devices described with reference to FIGS. 1, 2, 3A, and 3B. The operations performed at the network entity 405 and the UE 415 may support improvements to communications between the UE 415 and the network entity 405, among other benefits. In the following description of the process flow 400, the operations between the UE 415 and the network entity 405 may occur in a different order than the example order shown. Additionally, or alternatively, the operations performed by the UE 415 and the network entity 405 may be performed in different orders or at different times. Some operations may also be omitted. In the example of FIG. 4, the network entity 405 may be configured for SBFD operations in which the network entity 405 may simultaneously communicate with multiple UEs (e.g., including the UE 415) using a SBFD TTI (e.g., a slot or symbol configured for SBFD communications). For example, the network entity 405 may use one or more uplink subbands (or one or more flexible subbands) for uplink communications with a UE and one or more downlink subbands (or the one or more flexible subbands) of the same SBFD TTI for downlink communications with another UE.

At 420, the UE 415 may receive a control message identifying at least one TTI (e.g., at least one symbol or at least one slot) to be used for SBFD communications at the network entity 405. The control message may be an example of a control message as described throughout the present disclosure, including with reference to FIG. 2. For example, the control message may correspond to a TDD configuration. For example, the network entity 405 may transmit the control message using RRC signaling, which may include the TDD-UL-DL-ConfigCommon IE or the TDD-UL-DL-ConfigDedicated IE. Additionally, or alternatively, the network entity 405 may transmit the control message using broadcast signaling.

At 425, the UE 415 may receive a first indication of uplink resources for uplink communications during the at least one SBFD TTI. In some examples, the first indication may be an example of a first indication as described throughout the present disclosure, including with reference to FIG. 2. For example, the first indication may be for transmission of an uplink signal within at least one uplink subband (or at least one flexible subband) during the at least one SBFD TTI. Additionally, or alternatively, the first indication may include an uplink SFI (e.g., an SFI-U), a flexible SFI (e.g., an SFI-F), an RRC configuration, or a dynamic grant pertaining to the at least one SBFD TTI.

At 430, the UE 415 may receive a second indication of downlink resources for downlink communications during the at least one SBFD TTI. The second indication may be an example of a second indication as described throughout the present disclosure, including with reference to FIG. 2. For example, the second indication may be for reception of a downlink signal within at least one downlink subband (or the at least one flexible subband) during the at least one SBFD TTI. Additionally, or alternatively, the second indication may include a downlink SFI (e.g., an SFI-D), a flexible SFI (e.g., an SFI-F), an RRC configuration, or a dynamic grant pertaining to the at least one SBFD TTI.

At 435, the UE 415 may communicate with the network entity 405 during the at least one SBFD TTI according to the first indication or the second indication based on one or more prioritization rules. In some examples, the prioritization rules may be an example of prioritization rules as described throughout the present disclosure including with reference to FIG. 2. For example, the prioritization rules may include that reception of the downlink signal is prioritized over transmission of the uplink signal during the at least one SBFD TTI in an absence of a beam failure recovery procedure being triggered (e.g., at the UE 415). Additionally, or alternatively, the prioritization rules may include that transmission of the uplink signal is prioritized over reception of the downlink signal during the at least one SBFD TTI in a presence of a beam failure recovery procedure being triggered (e.g., at the UE 415). In some examples, the prioritization rules may include that reception of the downlink signal or transmission of the uplink signal is prioritized based on a respective channel priority associated with each of the downlink signal and uplink signal.

In some examples, at 440, the UE 415 may transmit an uplink signal to the network entity 405 using one or more uplink subbands (or one or more flexible subbands) during the at least one SBFD TTI based on the prioritization rules. The uplink signal may be an example of an uplink signal as described throughout the present disclosure, including with reference to FIG. 2. For example, the uplink signal may include a PUCCH signal, a PUSCH signal, an SRS, or a random access preamble.

In some other examples, at 445, the UE 415 may receive a downlink signal from the network entity 405 using one or more downlink subbands (or the one or more flexible subbands) during the at least one SBFD TTI. The downlink signal may be an example of a downlink signal as described throughout the present disclosure, including with reference to FIG. 2. For example, the downlink signal may include a PDCCH signal, a PDSCH signal, a CSI-RS, or a PRS. In some examples, using the prioritization rules to determine whether to receive the downlink signal or transmit the uplink signal during the at least one SBFD TTI may lead to increased resource utilization and reduced latency, among other possible benefits.

Figure 5:
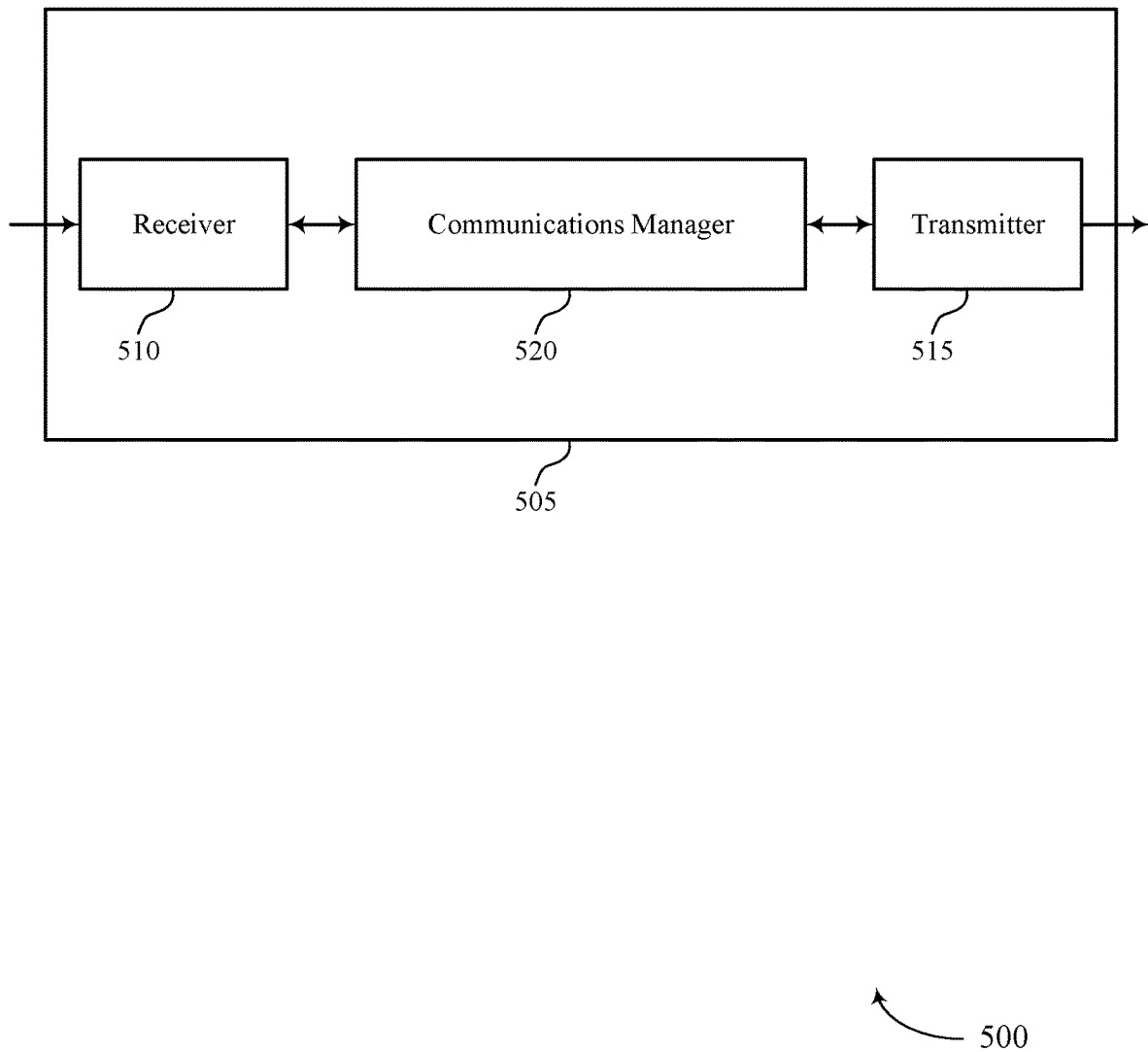
FIGS. 5 and 6 illustrate block diagrams of devices that support multiplexing rules for SBFD communications in accordance with one or more aspects of the present disclosure.

FIG. 5 illustrates a block diagram 500 of a device 505 that supports multiplexing rules for SBFD communications in accordance with one or more aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to multiplexing rules for SBFD communications). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to multiplexing rules for SBFD communications). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of multiplexing rules for SBFD communications as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communication at a first network node (e.g., the device 505) in accordance with examples as disclosed herein. For example, the communications manager 520 may be configured as or otherwise support a means for receiving a control message identifying at least one symbol or at least one slot to be used for SBFD communications at a second network node. The communications manager 520 may be configured as or otherwise support a means for receiving a first indication of uplink resources for uplink communications during the at least one symbol or the at least one slot. The communications manager 520 may be configured as or otherwise support a means for receiving a second indication of downlink resources for downlink communications during the at least one symbol or the at least one slot. The communications manager 520 may be configured as or otherwise support a means for communicating with the second network node during the at least one symbol or the at least one slot in accordance with one of the first indication or the second indication based on one or more prioritization rules.

By including or configuring the communications manager 520 in accordance with examples as described herein, the device 505 (e.g., a processor controlling or otherwise coupled with the receiver 510, the transmitter 515, the communications manager 520, or a combination thereof) may support techniques for more efficient utilization of communication resources.

Figure 6:
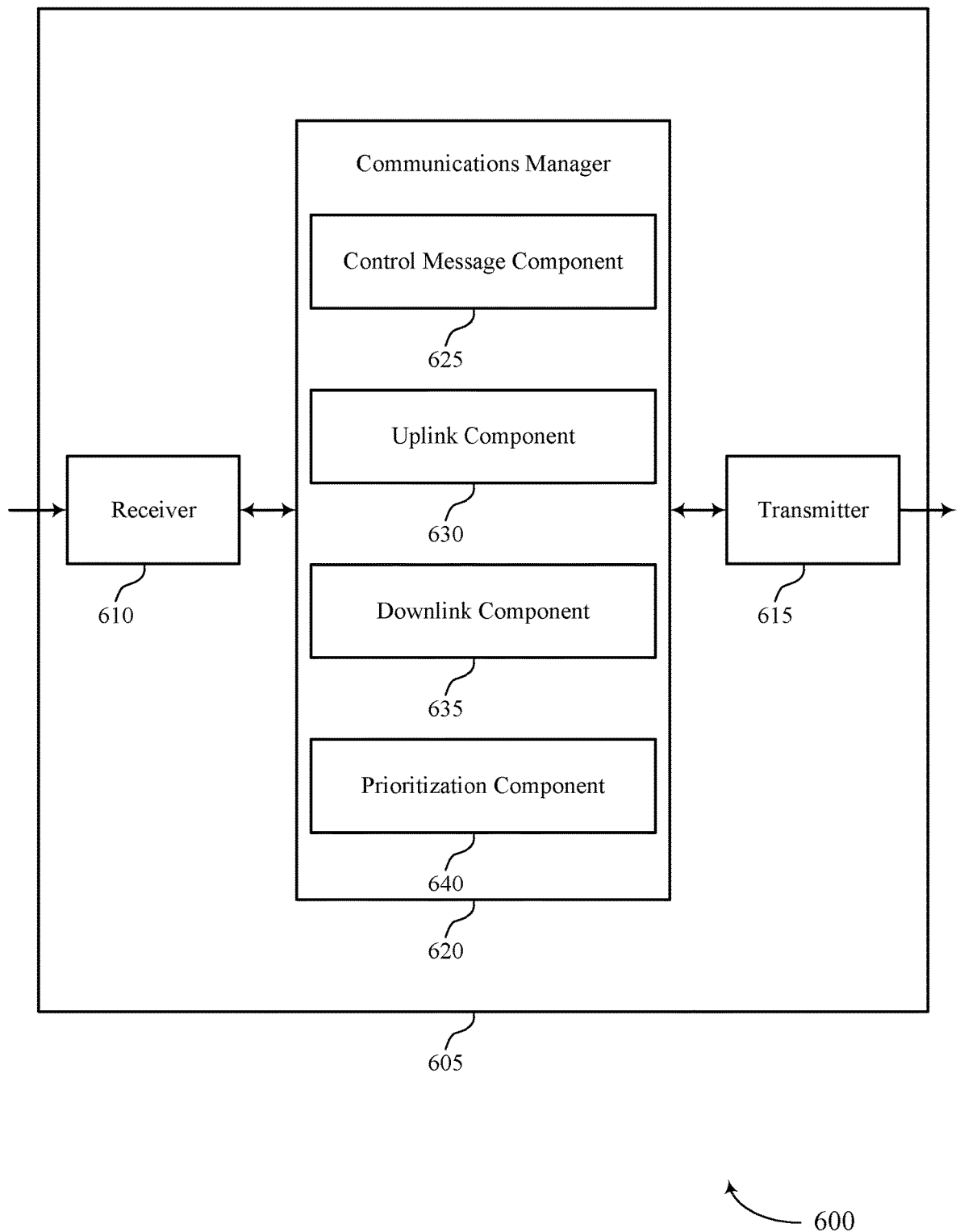

FIG. 6 illustrates a block diagram 600 of a device 605 that supports multiplexing rules for SBFD communications in accordance with one or more aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to multiplexing rules for SBFD communications). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to multiplexing rules for SBFD communications). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of multiplexing rules for SBFD communications as described herein. For example, the communications manager 620 may include a control message component 625, an uplink component 630, a downlink component 635, a prioritization component 640, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication at a first network node (e.g., the device 605)

in accordance with examples as disclosed herein. The control message component 625 may be configured as or otherwise support a means for receiving a control message identifying at least one symbol or at least one slot to be used for SBFD communications at a second network node. The uplink component 630 may be configured as or otherwise support a means for receiving a first indication of uplink resources for uplink communications during the at least one symbol or the at least one slot. The downlink component 635 may be configured as or otherwise support a means for receiving a second indication of downlink resources for downlink communications during the at least one symbol or the at least one slot. The prioritization component 640 may be configured as or otherwise support a means for communicating with the second network node during the at least one symbol or the at least one slot in accordance with one of the first indication or the second indication based on one or more prioritization rules.

Figure 7:
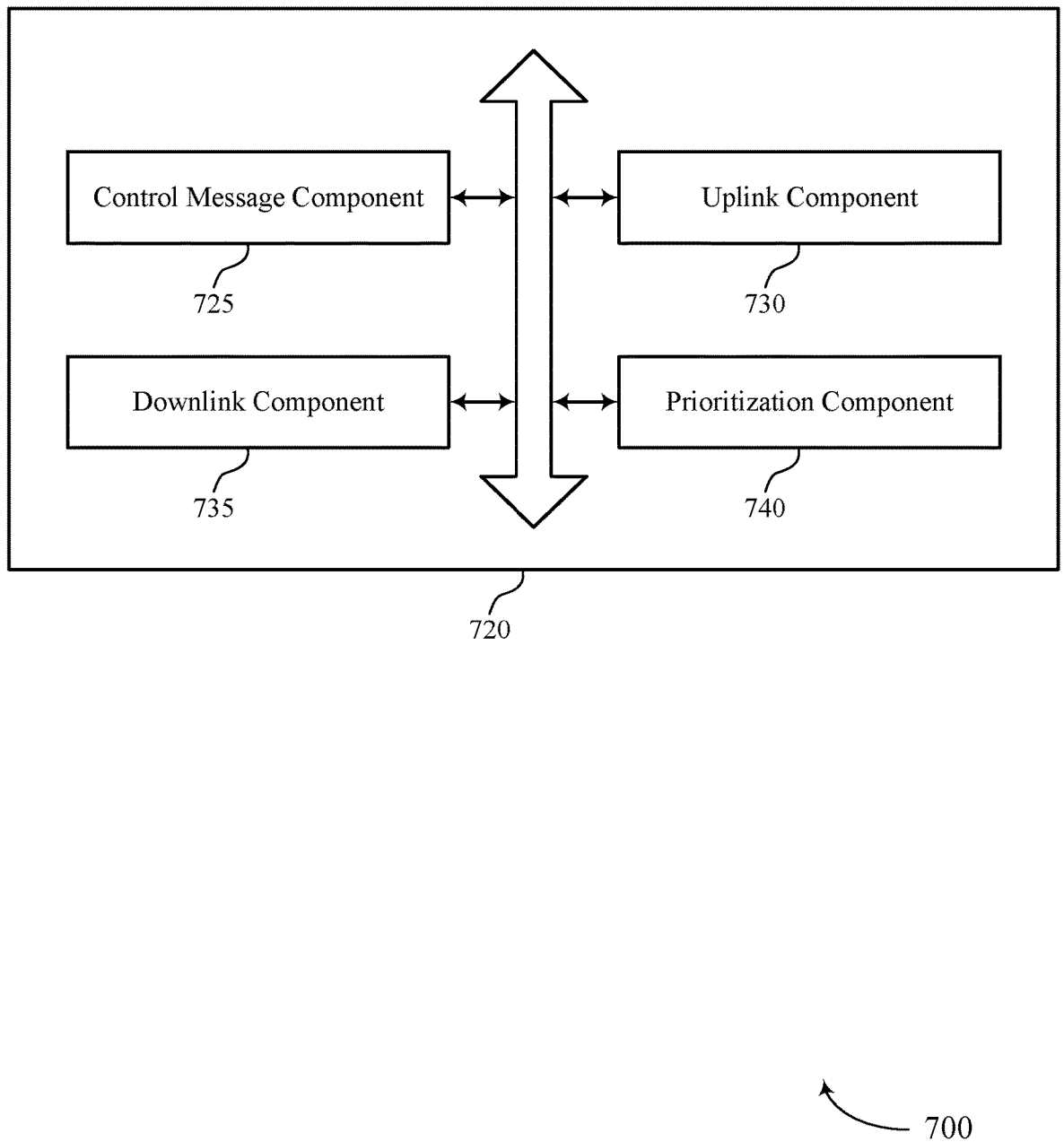
FIG. 7 illustrates a block diagram of a communications manager that supports multiplexing rules for SBFD communications in accordance with one or more aspects of the present disclosure.

FIG. 7 illustrates a block diagram 700 of a communications manager 720 that supports multiplexing rules for SBFD communications in accordance with one or more aspects of the present disclosure. The communications manager 720 may be an example of aspects of a communications manager 520, a communications manager 620, or both, as described herein. The communications manager 720, or various components thereof, may be an example of means for performing various aspects of multiplexing rules for SBFD communications as described herein. For example, the communications manager 720 may include a control message component 725, an uplink component 730, a downlink component 735, a prioritization component 740, or any combination thereof. Each of these components may communicate, directly or indirectly, with one another (e.g., via one or more buses).

The communications manager 720 may support wireless communication at a first network node in accordance with examples as disclosed herein. The control message component 725 may be configured as or otherwise support a means for receiving a control message identifying at least one symbol or at least one slot to be used for SBFD communications at a second network node. The uplink component 730 may be configured as or otherwise support a means for receiving a first indication of uplink resources for uplink communications during the at least one symbol or the at least one slot. The downlink component 735 may be configured as or otherwise support a means for receiving a second indication of downlink resources for downlink communications during the at least one symbol or the at least one slot. The prioritization component 740 may be configured as or otherwise support a means for communicating with the second network node during the at least one symbol or the at least one slot in accordance with one of the first indication or the second indication based on one or more prioritization rules.

In some examples, the uplink resources are within at least one uplink subband or at least one flexible subband. Additionally, the downlink resources are within at least one downlink subband or the at least one flexible subband. In some examples, the first indication is for transmission of an uplink signal within at least one uplink subband or at least one flexible subband during the at least one symbol or the at least one slot. Additionally, or alternatively, the second indication is for reception of a synchronization signal block within at least one downlink subband or at least one flexible subband during the at least one symbol or the at least one slot. In some examples, the first indication includes an uplink SFI pertaining to the at least one symbol or the at least one slot. In some examples, the uplink signal includes PUCCH signal, a PUSCH signal, an SRS, or a random access preamble.

In some examples, the first indication is for transmission of a random access preamble within at least one uplink subband or at least one flexible subband during the at least one symbol or the at least one slot. In some examples, the second indication is for reception of a downlink signal within at least one downlink subband or the at least one flexible subband during the at least one symbol or the at least one slot. Additionally, or alternatively, the second indication includes a downlink SFI pertaining to the at least one symbol or the at least one slot.

In some examples, the first indication is for transmission of an uplink signal within at least one uplink subband or at least one flexible subband during the at least one symbol or the at least one slot. In some examples, the second indication is for monitoring a downlink control channel within at least one downlink subband or the at least one flexible subband during the at least one symbol or the at least one slot. Additionally, or alternatively, the first indication includes an uplink SFI pertaining to the at least one symbol or the at least one slot.

In some examples, the first indication is for transmission of an uplink signal within at least one uplink subband or at least one flexible subband during the at least one symbol or the at least one slot. Additionally, the second indication is for reception of a downlink signal within at least one downlink subband or the at least one flexible subband during the at least one symbol or the at least one slot.

In some examples, the first indication includes an uplink SFI pertaining to the at least one symbol or the at least one slot. Additionally, the second indication includes an RRC configuration pertaining to the at least one symbol or the at least one slot. In some examples, the uplink signal includes a PUCCH signal, a PUSCH signal, an SRS, or a random access preamble.

In some examples, the first indication includes an RRC configuration pertaining to the at least one symbol or the at least one slot. Additionally, the second indication includes a downlink SFI pertaining to the at least one symbol or the at least one slot. In some examples, the downlink signal includes a PDCCH signal, a PDSCH signal, a CSI-RS, or a PRS.

In some examples, the second indication includes a flexible RRC configuration pertaining to the at least one symbol or the at least one slot. Additionally, or alternatively, the uplink signal includes a PUCCH signal, a PUSCH signal, an SRS, or a random access preamble.

In some examples, the first indication includes an uplink SFI pertaining to the at least one symbol or the at least one slot and the second indication includes a dynamic grant pertaining to the at least one symbol or the at least one slot. Additionally, the downlink signal includes a PDSCH signal or a CSI-RS.

In some examples, the first indication includes an SFI or a flexible SFI pertaining to the at least one symbol or the at least one slot. Additionally, the downlink signal includes a PDCCH signal, a semi-persistent downlink signal, or a CSI-RS.

In some examples, the first indication includes a dynamic grant pertaining to the at least one symbol or the at least one slot and the second indication includes a downlink SFI pertaining to the at least one symbol or the at least one slot. Additionally, the uplink signal includes a PUCCH signal, a PUSCH signal, an SRS, or a random access preamble.

In some examples, the second indication includes a downlink SFI or a flexible SFI pertaining to the at least one symbol or the at least one slot. Additionally, the uplink signal includes a PUCCH signal, a PUSCH signal, an SRS, or a random access preamble.

In some examples, the first indication includes a dynamic grant pertaining to the at least one symbol or the at least one slot. Additionally, the downlink signal includes a PDCCH signal, a semi-persistent downlink signal, a CSI-RS, or a PRS.

In some examples, the second indication includes a dynamic grant pertaining to the at least one symbol or the at least one slot. Additionally, the uplink signal includes a PUCCH signal, a PUSCH signal, an SRS, or a random access preamble.

In some examples, the first indication includes an uplink SFI, a flexible SFI, an RRC configuration, or a dynamic grant pertaining to the at least one symbol or the at least one slot. Additionally, or alternatively, the second indication includes a downlink SFI, a flexible SFI, an RRC configuration, or a dynamic grant pertaining to the at least one symbol or the at least one slot.

In some examples, the uplink signal includes a PUCCH signal, a PUSCH signal, an SRS, or a random access preamble. Additionally, or alternatively, the downlink signal includes a PDCCH signal, a PDSCH signal, a CSI-RS, or a PRS.

In some examples, the one or more prioritization rules include that reception of the downlink signal is prioritized over transmission of the uplink signal during the at least one symbol or the at least one slot in an absence of a beam failure recovery procedure being triggered, and that transmission of the uplink signal is prioritized over reception of the downlink signal during the at least one symbol or the at least one slot in a presence of a beam failure recovery procedure being triggered. In some examples, the second indication includes a downlink SFI pertaining to the at least one symbol or the at least one slot, and wherein the downlink signal comprises PDSCH signal, a semi-persistent downlink signal, or a CSI-RS. In some other examples, the first indication includes a flexible RRC configuration pertaining to the at least one symbol or the at least one slot, and wherein the uplink signal comprises an SRS or a random access preamble.

In some examples, the one or more prioritization rules include that reception of the downlink signal or transmission of the uplink signal is prioritized based on a respective channel priority associated with each of the downlink signal and uplink signal.

In some examples, the uplink resources and the downlink resources are within one or more carriers to be used for TDD communications between the first network node and the second network node.

In some examples, the first indication is for a first component carrier of a radio frequency spectrum band and the second indication is for a second component carrier of the radio frequency spectrum band, the first component carrier different from the second component carrier.

In some examples, the control message further identifies one or more of a frequency location of at least one uplink subband to be used for transmission of uplink messages during the at least one symbol or the at least one slot, at least one downlink subband to be used for reception of downlink messages during the at least one symbol or the at least one slot, at least one guard band in between an uplink subband and a downlink subband during the at least one symbol or the at least one slot, and at least one flexible subband to be used for transmission of the uplink messages or reception of the downlink messages during the at least one symbol or the at least one slot.

In some examples, the uplink resources or the downlink resources include periodic resources or semi-persistent resources. In some examples, the first network node includes a UE and the second network node includes a base station.

Figure 8:
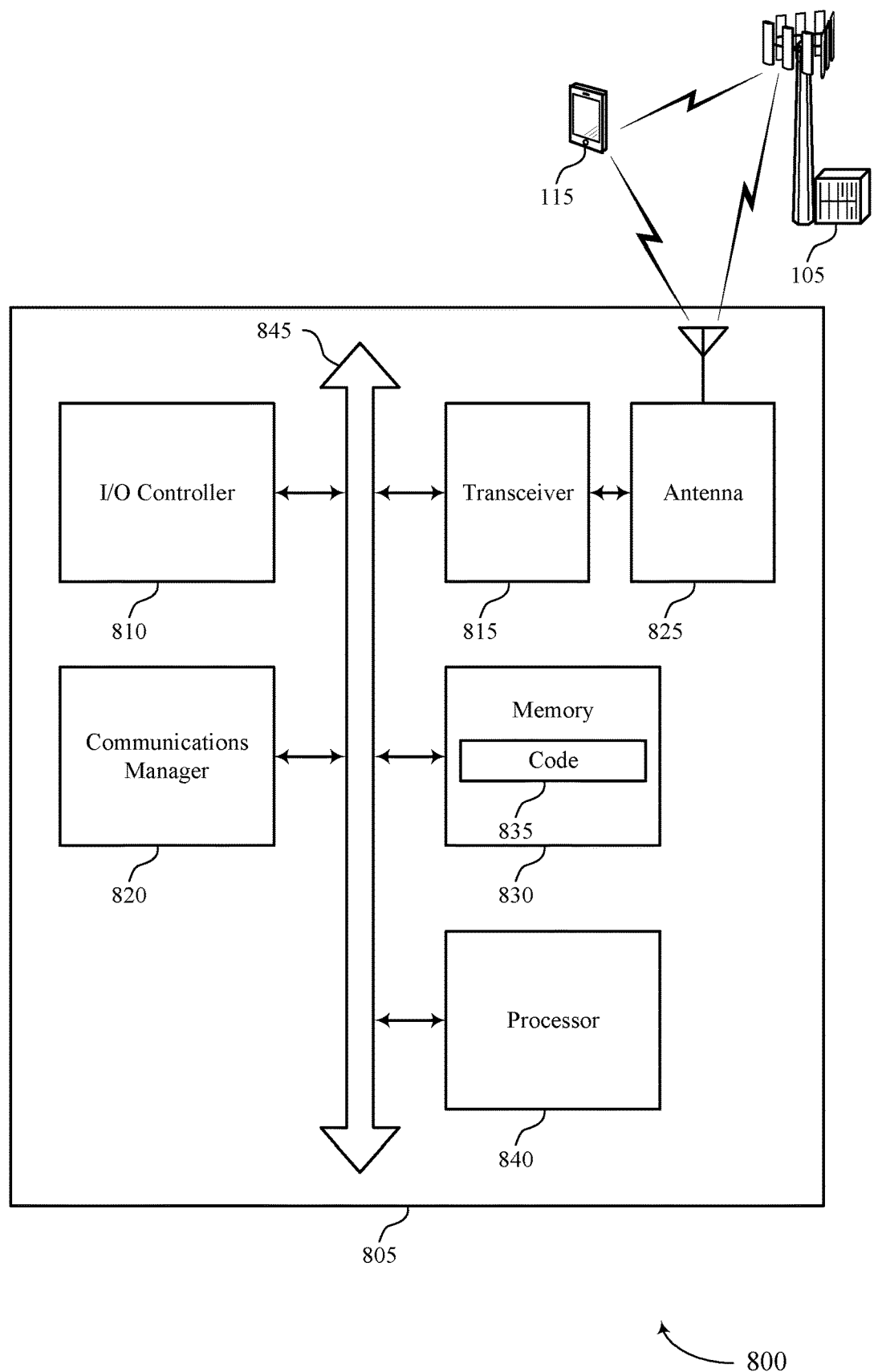
FIG. 8 illustrates a diagram of a system including a device that supports multiplexing rules for SBFD communications in accordance with one or more aspects of the present disclosure.

FIG. 8 illustrates a diagram of a system 800 including a device 805 that supports multiplexing rules for SBFD communications in accordance with one or more aspects of the present disclosure. The device 805 may be an example of or include the components of a device 505, a device 605, or a UE 115 as described herein. The device 805 may communicate (e.g., wirelessly) with one or more network entities 105, one or more UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another operating system. Additionally, or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed)

to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting multiplexing rules for SBFD communications). For example, the device 805 or a component of the device 805 may include a processor 840 and memory 830 coupled with or to the processor 840, the processor 840 and memory 830 configured to perform various functions described herein.

The communications manager 820 may support wireless communication at a first network node (e.g., the device 805) in accordance with examples as disclosed herein. For example, the communications manager 820 may be configured as or otherwise support a means for receiving a control message identifying at least one symbol or at least one slot to be used for SBFD communications at a second network node. The communications manager 820 may be configured as or otherwise support a means for receiving a first indication of uplink resources for uplink communications during the at least one symbol or the at least one slot. The communications manager 820 may be configured as or otherwise support a means for receiving a second indication of downlink resources for downlink communications during the at least one symbol or the at least one slot. The communications manager 820 may be configured as or otherwise support a means for communicating with the second network node during the at least one symbol or the at least one slot in accordance with one of the first indication or the second indication based on one or more prioritization rules.

By including or configuring the communications manager 820 in accordance with examples as described herein, the device 805 may support techniques for improved communication reliability, reduced latency, and more efficient utilization of communication resources.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of multiplexing rules for SBFD communications as described herein, or the processor 840 and the memory 830 may be otherwise configured to perform or support such operations.

Figure 9:
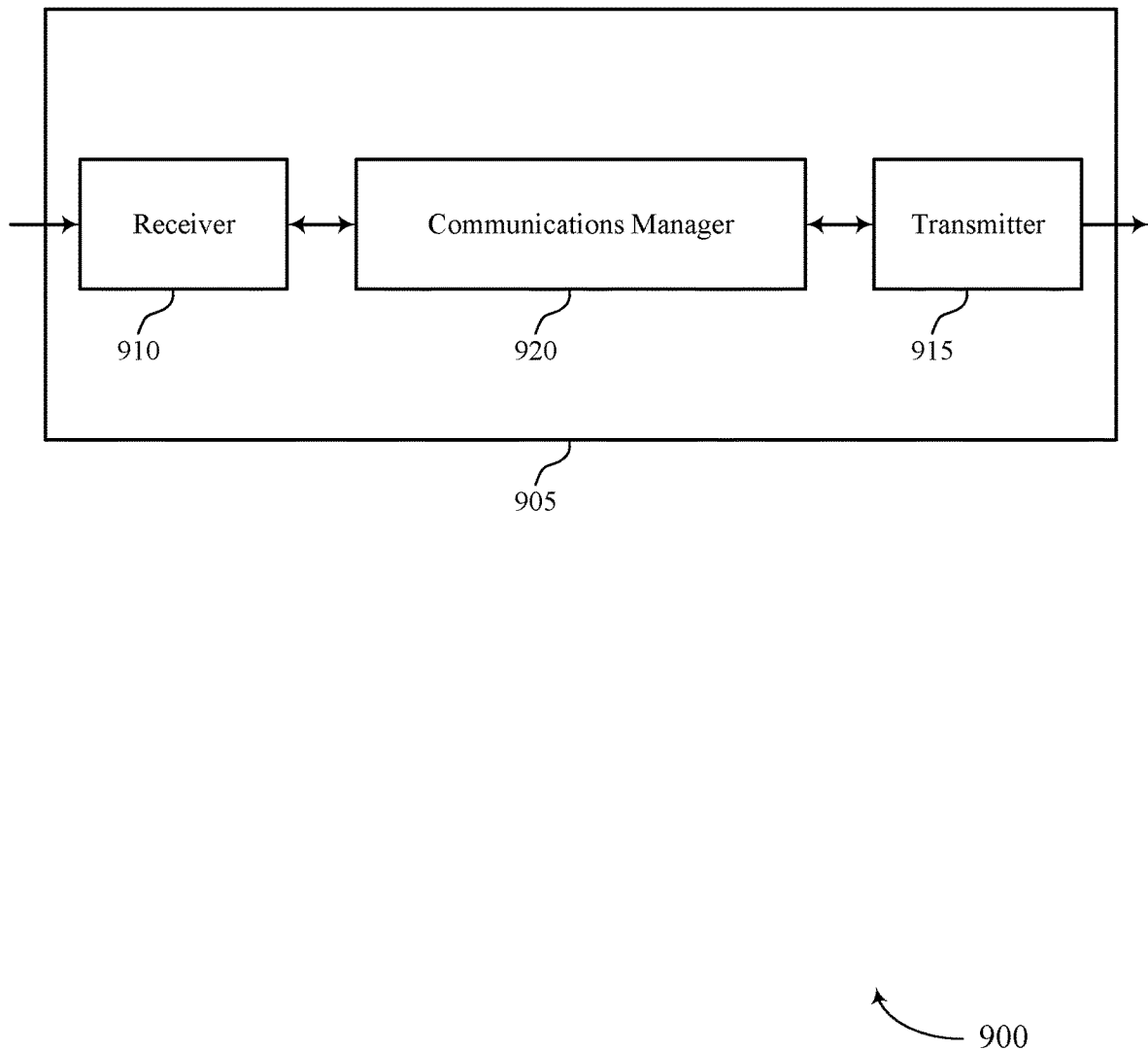
FIGS. 9 and 10 illustrate block diagrams of devices that support multiplexing rules for SBFD communications in accordance with one or more aspects of the present disclosure.

FIG. 9 illustrates a block diagram 900 of a device 905 that supports multiplexing rules for SBFD communications in accordance with one or more aspects of the present disclosure. The device 905 may be an example of aspects of a network entity 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The communications manager 920, the receiver 910, the transmitter 915, or various combinations thereof or various components thereof may be examples of means for performing various aspects of multiplexing rules for SBFD communications as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communication at a network node (e.g., the device 905) in accordance with examples as disclosed herein. For example, the communications manager 920 may be configured as or otherwise support a means for outputting a control message identifying at least one symbol or at least one slot to be used for SBFD communications at the network node. The communications manager 920 may be configured as or otherwise support a means for outputting a first indication of uplink resources for uplink communications during the at least one symbol or the at least one slot. The communications manager 920 may be configured as or otherwise support a means for outputting a second indication of downlink resources for downlink communications during the at least one symbol or the at least one slot. The communications manager 920 may be configured as or otherwise support a means for communicating, during the at least one symbol or the at least one slot, in accordance with one of the first indication or the second indication based on one or more prioritization rules.

By including or configuring the communications manager 920 in accordance with examples as described herein, the device 905 (e.g., a processor controlling or otherwise coupled with the receiver 910, the transmitter 915, the communications manager 920, or a combination thereof) may support techniques for more efficient utilization of communication resources.

Figure 10:
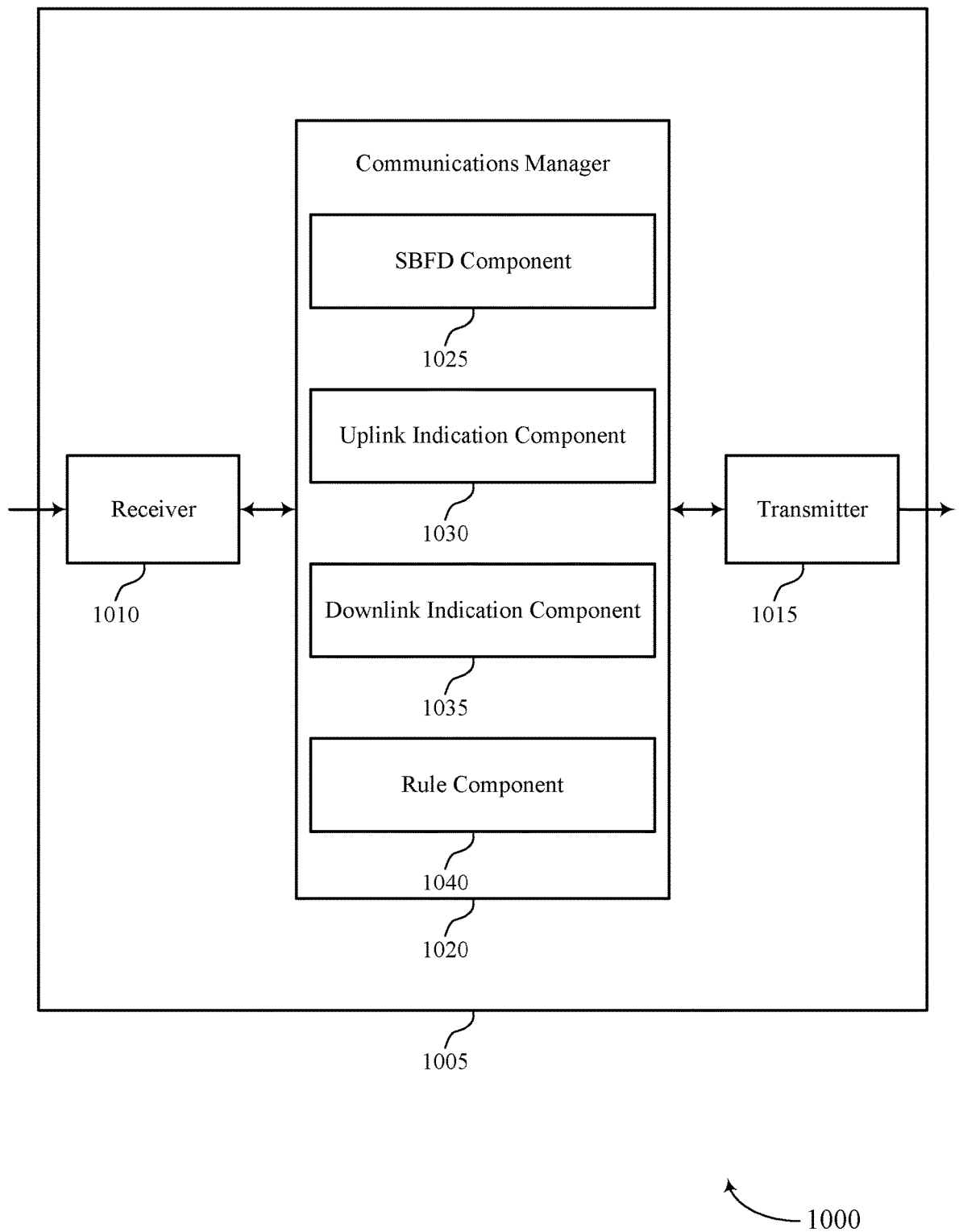

FIG. 10 illustrates a block diagram 1000 of a device 1005 that supports multiplexing rules for SBFD communications in accordance with one or more aspects of the present disclosure. The device 1005 may be an example of aspects of a device 905 or a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The device 1005, or various components thereof, may be an example of means for performing various aspects of multiplexing rules for SBFD communications as described herein. For example, the communications manager 1020 may include an SBFD component 1025, an uplink indication component 1030, a downlink indication component 1035, a rule component 1040, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communication at a network node (e.g., the device 1005) in accordance with examples as disclosed herein. The SBFD component 1025 may be configured as or otherwise support a means for outputting a control message identifying at least one symbol or at least one slot to be used for SBFD communications at the network node. The uplink indication component 1030 may be configured as or otherwise support a means for outputting a first indication of uplink resources for uplink communications during the at least one symbol or the at least one slot. The downlink indication component 1035 may be configured as or otherwise support a means for outputting a second indication of downlink resources for downlink communications during the at least one symbol or the at least one slot. The rule component 1040 may be configured as or otherwise support a means for communicating, during the at least one symbol or the at least one slot, in accordance with one of the first indication or the second indication based on one or more prioritization rules.

Figure 11:
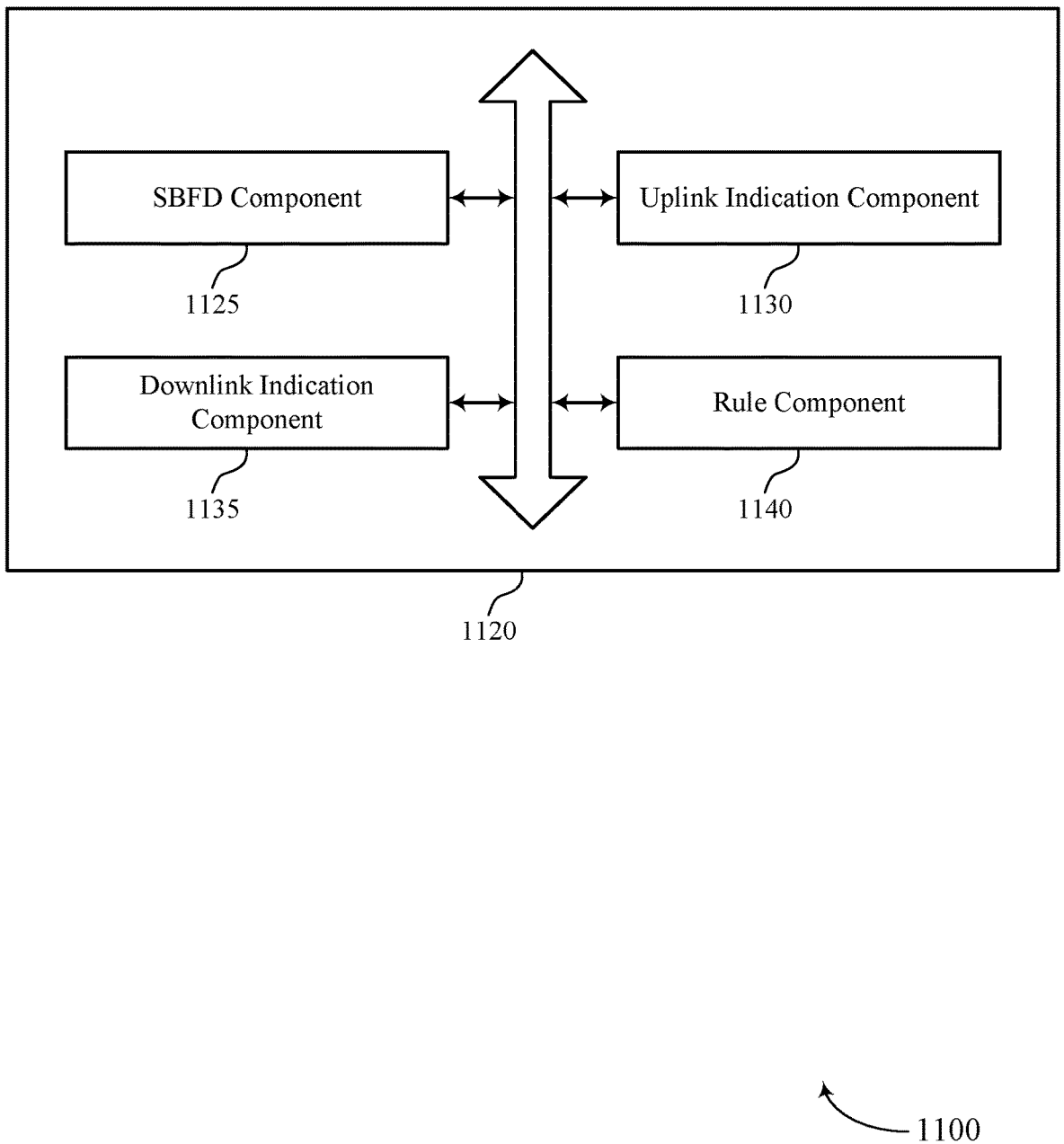
FIG. 11 illustrates a block diagram of a communications manager that supports multiplexing rules for SBFD communications in accordance with one or more aspects of the present disclosure.

FIG. 11 illustrates a block diagram 1100 of a communications manager 1120 that supports multiplexing rules for SBFD communications in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of multiplexing rules for SBFD communications as described herein. For example, the communications manager 1120 may include an SBFD component 1125, an uplink indication component 1130, a downlink indication component 1135, a rule component 1140, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1120 may support wireless communication at a network node in accordance with examples as disclosed herein. The SBFD component 1125 may be configured as or otherwise support a means for outputting a control message identifying at least one symbol or at least one slot to be used for SBFD communications at the network node. The uplink indication component 1130 may be configured as or otherwise support a means for outputting a first indication of uplink resources for uplink communications during the at least one symbol or the at least one slot. The downlink indication component 1135 may be configured as or otherwise support a means for outputting a second indication of downlink resources for downlink communications during the at least one symbol or the at least one slot. The rule component 1140 may be configured as or otherwise support a means for communicating, during the at least one symbol or the at least one slot, in accordance with one of the first indication or the second indication based on one or more prioritization rules.

In some examples, the uplink resources are within at least one uplink subband or at least one flexible subband. In some examples, the downlink resources are within at least one downlink subband or the at least one flexible subband.

In some examples, the first indication is for communication of an uplink signal within at least one uplink subband or at least one flexible subband during the at least one symbol or the at least one slot. In some examples, the second indication is for communication of a synchronization signal block within at least one downlink subband or the at least one flexible subband during the at least one symbol or the at least one slot. Additionally, or alternatively, the first indication includes an uplink SFI pertaining to the at least one symbol or the at least one slot. In some examples, the uplink signal includes PUCCH signal, a PUSCH signal, an SRS, or a random access preamble.

In some examples, the first indication is for communication of a random access preamble within at least one uplink subband or at least one flexible subband during the at least one symbol or the at least one slot. In some examples, the second indication is for communication of a downlink signal within at least one downlink subband or the at least one flexible subband during the at least one symbol or the at least one slot. Additionally, or alternatively, the second indication includes a downlink SFI pertaining to the at least one symbol or the at least one slot.

In some examples, the first indication is for communication of an uplink signal within at least one uplink subband or at least one flexible subband during the at least one symbol or the at least one slot. In some examples, the second indication is for communication using a downlink control channel within at least one downlink subband or the at least one flexible subband during the at least one symbol or the at least one slot. Additionally, or alternatively, the first indication includes an uplink SFI pertaining to the at least one symbol or the at least one slot.

In some examples, the first indication is for communication of an uplink signal within at least one uplink subband or at least one flexible subband during the at least one symbol or the at least one slot. In some examples, the second indication is for communication of a downlink signal within at least one downlink subband or the at least one flexible subband during the at least one symbol or the at least one slot.

In some examples, the first indication includes an uplink SFI pertaining to the at least one symbol or the at least one slot. Additionally, the second indication includes an RRC configuration pertaining to the at least one symbol or the at least one slot. In some examples, the uplink signal includes a PUCCH signal, a PUSCH signal, an SRS, or a random access preamble.

In some examples, the first indication includes an RRC configuration pertaining to the at least one symbol or the at least one slot. Additionally, the second indication includes a downlink SFI pertaining to the at least one symbol or the at least one slot. In some examples, the downlink signal includes a PDCCH signal, a PDSCH signal, a CSI-RS, or a PRS.

In some examples, the second indication includes a flexible RRC configuration pertaining to the at least one symbol or the at least one slot. Additionally, or alternatively, the uplink signal includes a PUCCH signal, a PUSCH signal, an SRS, or a random access preamble.

In some examples, the first indication includes an uplink SFI pertaining to the at least one symbol or the at least one slot and the second indication includes a dynamic grant pertaining to the at least one symbol or the at least one slot. Additionally, the downlink signal includes a PDSCH signal or a CSI-RS.

In some examples, the first indication includes an SFI or a flexible SFI pertaining to the at least one symbol or the at least one slot. Additionally, the downlink signal includes a PDCCH signal, a semi-persistent downlink signal, or a CSI-RS.

In some examples, the first indication includes a dynamic grant pertaining to the at least one symbol or the at least one slot and the second indication includes a downlink SFI pertaining to the at least one symbol or the at least one slot. Additionally, the uplink signal includes a PUCCH signal, a PUSCH signal, an SRS, or a random access preamble.

In some examples, the second indication includes a downlink SFI or a flexible SFI pertaining to the at least one symbol or the at least one slot. Additionally, the uplink signal includes a PUCCH signal, a PUSCH signal, an SRS, or a random access preamble.

In some examples, the first indication includes a dynamic grant pertaining to the at least one symbol or the at least one slot. Additionally, the downlink signal includes a PDCCH signal, a semi-persistent downlink signal, a CSI-RS, or a PRS.

In some examples, the second indication includes a dynamic grant pertaining to the at least one symbol or the at least one slot. Additionally, the uplink signal includes a PUCCH signal, a PUSCH signal, an SRS, or a random access preamble.

In some examples, the first indication includes an uplink SFI, a flexible SFI, an RRC configuration, or a dynamic grant pertaining to the at least one symbol or the at least one slot. In some examples, the second indication includes a downlink SFI, a flexible SFI, an RRC configuration, or a dynamic grant pertaining to the at least one symbol or the at least one slot. In some examples, the uplink signal includes a PUCCH signal, a PUSCH signal, an SRS, or a random access preamble. In some examples, the downlink signal includes a PDCCH signal, a PDSCH signal, a CSI-RS, or a PRS.

In some examples, the one or more prioritization rules include that communication of the downlink signal is prioritized over communication of the uplink signal during the at least one symbol or the at least one slot in an absence of a beam failure recovery procedure being triggered, and that communication of the uplink signal is prioritized over communication of the downlink signal during the at least one symbol or the at least one slot in a presence of a beam failure recovery procedure being triggered. In some examples, the second indication includes a downlink SFI pertaining to the at least one symbol or the at least one slot, and wherein the downlink signal comprises PDSCH signal, a semi-persistent downlink signal, or a CSI-RS. In some other examples, the first indication includes a flexible RRC configuration pertaining to the at least one symbol or the at least one slot, and wherein the uplink signal comprises an SRS or a random access preamble.

In some examples, the one or more prioritization rules include that communication of the downlink signal or the uplink signal is prioritized based on a respective channel priority associated with each of the downlink signal and uplink signal.

In some examples, the uplink resources and the downlink resources are within one or more carriers to be used for TDD communications at the network node. In some examples, the first indication is for a first component carrier of a radio frequency spectrum band and the second indication is for a second component carrier of the radio frequency spectrum band, the first component carrier different from the second component carrier.

In some examples, the control message further identifies one or more of a frequency location of at least one uplink subband to be used for communication of uplink messages during the at least one symbol or the at least one slot, at least one downlink subband to be used for communication of downlink messages during the at least one symbol or the at least one slot, at least one guard band in between an uplink subband and a downlink subband during the at least one symbol or the at least one slot, and at least one flexible subband to be used for communication of the uplink messages or the downlink messages during the at least one symbol or the at least one slot.

In some examples, the uplink resources or the downlink resources include periodic resources or semi-persistent resources. In some examples, the network node includes a base station.

Figure 12:
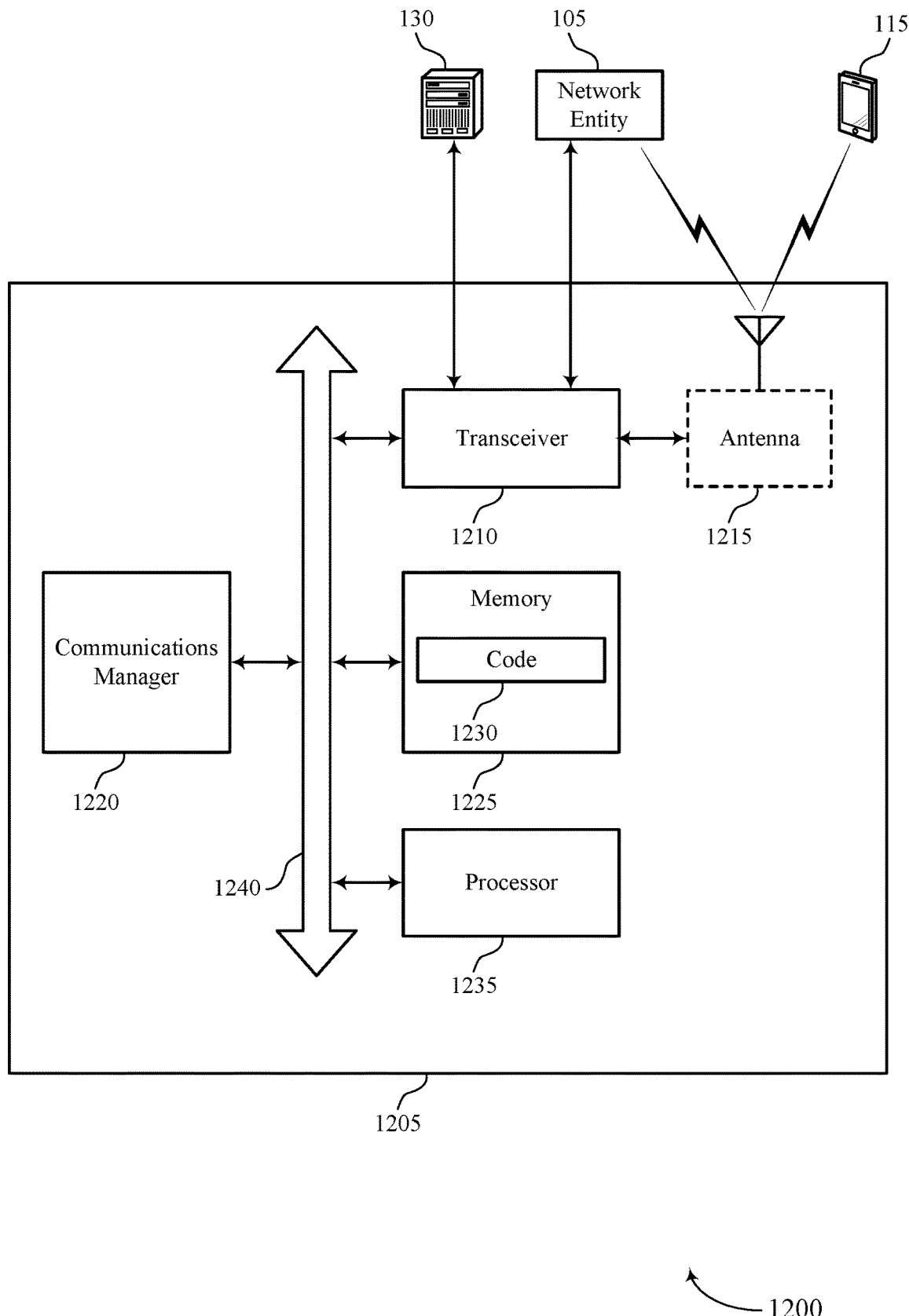
FIG. 12 illustrates a diagram of a system including a device that supports multiplexing rules for SBFD communications in accordance with one or more aspects of the present disclosure.

FIG. 12 illustrates a diagram of a system 1200 including a device 1205 that supports multiplexing rules for SBFD communications in accordance with one or more aspects of the present disclosure. The device 1205 may be an example of or include the components of a device 905, a device 1005, or a network entity 105 as described herein. The device 1205 may communicate with one or more network entities 105, one or more UEs 115, or any combination thereof, which may include communications over one or more wired interfaces, over one or more wireless interfaces, or any combination thereof. The device 1205 may include components that support outputting and obtaining communications, such as a communications manager 1220, a transceiver 1210, an antenna 1215, a memory 1225, code 1230, and a processor 1235. These components may be in electronic communication or otherwise coupled (e.g., operatively, communicatively, functionally, electronically, electrically) via one or more buses (e.g., a bus 1240).

The transceiver 1210 may support bi-directional communications via wired links, wireless links, or both as described herein. In some examples, the transceiver 1210 may include a wired transceiver and may communicate bi-directionally with another wired transceiver. Additionally, or alternatively, in some examples, the transceiver 1210 may include a wireless transceiver and may communicate bi-directionally with another wireless transceiver. In some examples, the device 1205 may include one or more antennas 1215, which may be capable of transmitting or receiving wireless transmissions (e.g., concurrently). The transceiver 1210 may also include a modem to modulate signals, to provide the modulated signals for transmission (e.g., by one or more antennas 1215, by a wired transmitter), to receive modulated signals (e.g., from one or more antennas 1215, from a wired receiver), and to demodulate signals. In some implementations, the transceiver 1210 may include one or more interfaces, such as one or more interfaces coupled with the one or more antennas 1215 that are configured to support various receiving or obtaining operations, or one or more interfaces coupled with the one or more antennas 1215 that are configured to support various transmitting or outputting operations, or a combination thereof. In some implementations, the transceiver 1210 may include or be configured for coupling with one or more processors or memory components that are operable to perform or support operations based on received or obtained information or signals, or to generate information or other signals for transmission or other outputting, or any combination thereof. In some implementations, the transceiver 1210, or the transceiver 1210 and the one or more antennas 1215, or the transceiver 1210 and the one or more antennas 1215 and one or more processors or memory components (for example, the processor 1235, or the memory 1225, or both), may be included in a chip or chip assembly that is installed in the device 1205. In some examples, the transceiver may be operable to support communications via one or more communications links (e.g., a communication link 125, a backhaul communication link 120, a midhaul communication link 162, a fronthaul communication link 168).

The memory 1225 may include RAM and ROM. The memory 1225 may store computer-readable, computer-executable code 1230 including instructions that, when executed by the processor 1235, cause the device 1205 to perform various functions described herein. The code 1230 may be stored in a non-transitory computer-readable medium such as system memory or another type of memory. In some cases, the code 1230 may not be directly executable by the processor 1235 but may cause a computer (e.g., when compiled and executed) to perform functions described herein. In some cases, the memory 1225 may contain, among other things, a BIOS which may control basic hardware or software operation such as the interaction with peripheral components or devices.

The processor 1235 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1235 may be configured to operate a memory array using a memory controller. In some other cases, a memory controller may be integrated into the processor 1235. The processor 1235 may be configured to execute computer-readable instructions stored in a memory (e.g., the memory 1225) to cause the device 1205 to perform various functions (e.g., functions or tasks supporting multiplexing rules for SBFD communications). For example, the device 1205 or a component of the device 1205 may include a processor 1235 and memory 1225 coupled with the processor 1235, the processor 1235 and memory 1225 configured to perform various functions described herein. The processor 1235 may be an example of a cloud-computing platform (e.g., one or more physical nodes and supporting software such as operating systems, virtual machines, or container instances) that may host the functions (e.g., by executing code 1230) to perform the functions of the device 1205. The processor 1235 may be any one or more suitable processors capable of executing scripts or instructions of one or more software programs stored in the device 1205 (such as within the memory 1225). In some implementations, the processor 1235 may be a component of a processing system. A processing system may generally refer to a system or series of machines or components that receives inputs and processes the inputs to produce a set of outputs (which may be passed to other systems or components of, for example, the device 1205). For example, a processing system of the device 1205 may refer to a system including the various other components or subcomponents of the device 1205, such as the processor 1235, or the transceiver 1210, or the communications manager 1220, or other components or combinations of components of the device 1205. The processing system of the device 1205 may interface with other components of the device 1205, and may process information received from other components (such as inputs or signals) or output information to other components. For example, a chip or modem of the device 1205 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1205 may transmit information output from the chip or modem. Additionally, or alternatively, in some implementations, the one or more interfaces may refer to an interface between the processing system of the chip or modem and a receiver, such that the device 1205 may obtain information or signal inputs, and the information may be passed to the processing system. A person having ordinary skill in the art will readily recognize that a first interface also may obtain information or signal inputs, and a second interface also may output information or signal outputs.

In some examples, a bus 1240 may support communications of (e.g., within) a protocol layer of a protocol stack. In some examples, a bus 1240 may support communications associated with a logical channel of a protocol stack (e.g., between protocol layers of a protocol stack), which may include communications performed within a component of the device 1205, or between different components of the device 1205 that may be co-located or located in different locations (e.g., where the device 1205 may refer to a system in which one or more of the communications manager 1220, the transceiver 1210, the memory 1225, the code 1230, and the processor 1235 may be located in one of the different components or divided between different components).

In some examples, the communications manager 1220 may manage aspects of communications with a core network 130 (e.g., via one or more wired or wireless backhaul links). For example, the communications manager 1220 may manage the transfer of data communications for client devices, such as one or more UEs 115. In some examples, the communications manager 1220 may manage communications with other network entities 105, and may include a controller or scheduler for controlling communications with UEs 115 in cooperation with other network entities 105. In some examples, the communications manager 1220 may support an X2 interface within an LTE/LTE-A wireless communications network technology to provide communication between network entities 105.

The communications manager 1220 may support wireless communication at a network node (e.g., the device 1205) in accordance with examples as disclosed herein. For example, the communications manager 1220 may be configured as or otherwise support a means for outputting a control message identifying at least one symbol or at least one slot to be used for SBFD communications at the network node. The communications manager 1220 may be configured as or otherwise support a means for outputting a first indication of uplink resources for uplink communications during the at least one symbol or the at least one slot. The communications manager 1220 may be configured as or otherwise support a means for outputting a second indication of downlink resources for downlink communications during the at least one symbol or the at least one slot. The communications manager 1220 may be configured as or otherwise support a means for communicating, during the at least one symbol or the at least one slot, in accordance with one of the first indication or the second indication based on one or more prioritization rules.

By including or configuring the communications manager 1220 in accordance with examples as described herein, the device 1205 may support techniques for improved communication reliability, reduced latency, and more efficient utilization of communication resources.

In some examples, the communications manager 1220 may be configured to perform various operations (e.g., receiving, obtaining, monitoring, outputting, transmitting) using or otherwise in cooperation with the transceiver 1210, the one or more antennas 1215 (e.g., where applicable), or any combination thereof. Although the communications manager 1220 is illustrated as a separate component, in some examples, one or more functions described with reference to the communications manager 1220 may be supported by or performed by the transceiver 1210, the processor 1235, the memory 1225, the code 1230, or any combination thereof. For example, the code 1230 may include instructions executable by the processor 1235 to cause the device 1205 to perform various aspects of multiplexing rules for SBFD communications as described herein, or the processor 1235 and the memory 1225 may be otherwise configured to perform or support such operations.

Figure 13:
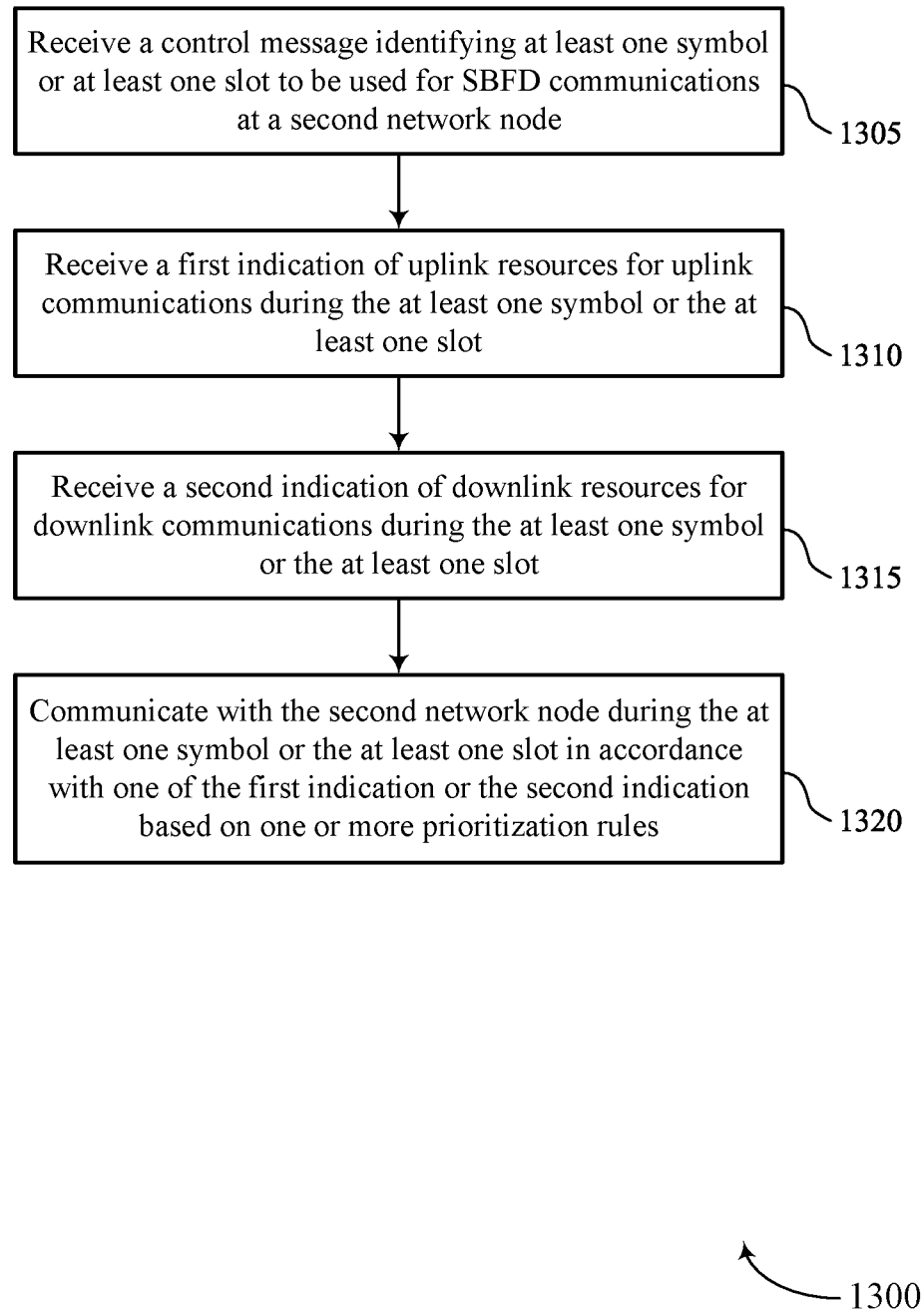
FIGS. 13 and 14 illustrate flowcharts showing methods that support multiplexing rules for SBFD communications in accordance with one or more aspects of the present disclosure.

FIG. 13 illustrates a flowchart illustrating a method 1300 that supports multiplexing rules for SBFD communications in accordance with one or more aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1305, the method may include receiving a control message identifying at least one symbol or at least one slot to be used for SBFD communications at a second network node. The operations of 1305 may be performed in accordance with examples as disclosed herein. In some examples, aspects of the operations of 1305 may be performed by a control message component 725 as described with reference to FIG. 7.

At 1310, the method may include receiving a first indication of uplink resources for uplink communications during the at least one symbol or the at least one slot. The operations of 1310 may be performed in accordance with examples as disclosed herein. In some examples, aspects of the operations of 1310 may be performed by an uplink component 730 as described with reference to FIG. 7.

At 1315, the method may include receiving a second indication of downlink resources for downlink communications during the at least one symbol or the at least one slot. The operations of 1315 may be performed in accordance with examples as disclosed herein. In some examples, aspects of the operations of 1315 may be performed by a downlink component 735 as described with reference to FIG. 7.

At 1320, the method may include communicating with the second network node during the at least one symbol or the at least one slot in accordance with one of the first indication or the second indication based on one or more prioritization rules. The operations of 1320 may be performed in accordance with examples as disclosed herein. In some examples, aspects of the operations of 1320 may be performed by a prioritization component 740 as described with reference to FIG. 7.

Figure 14:
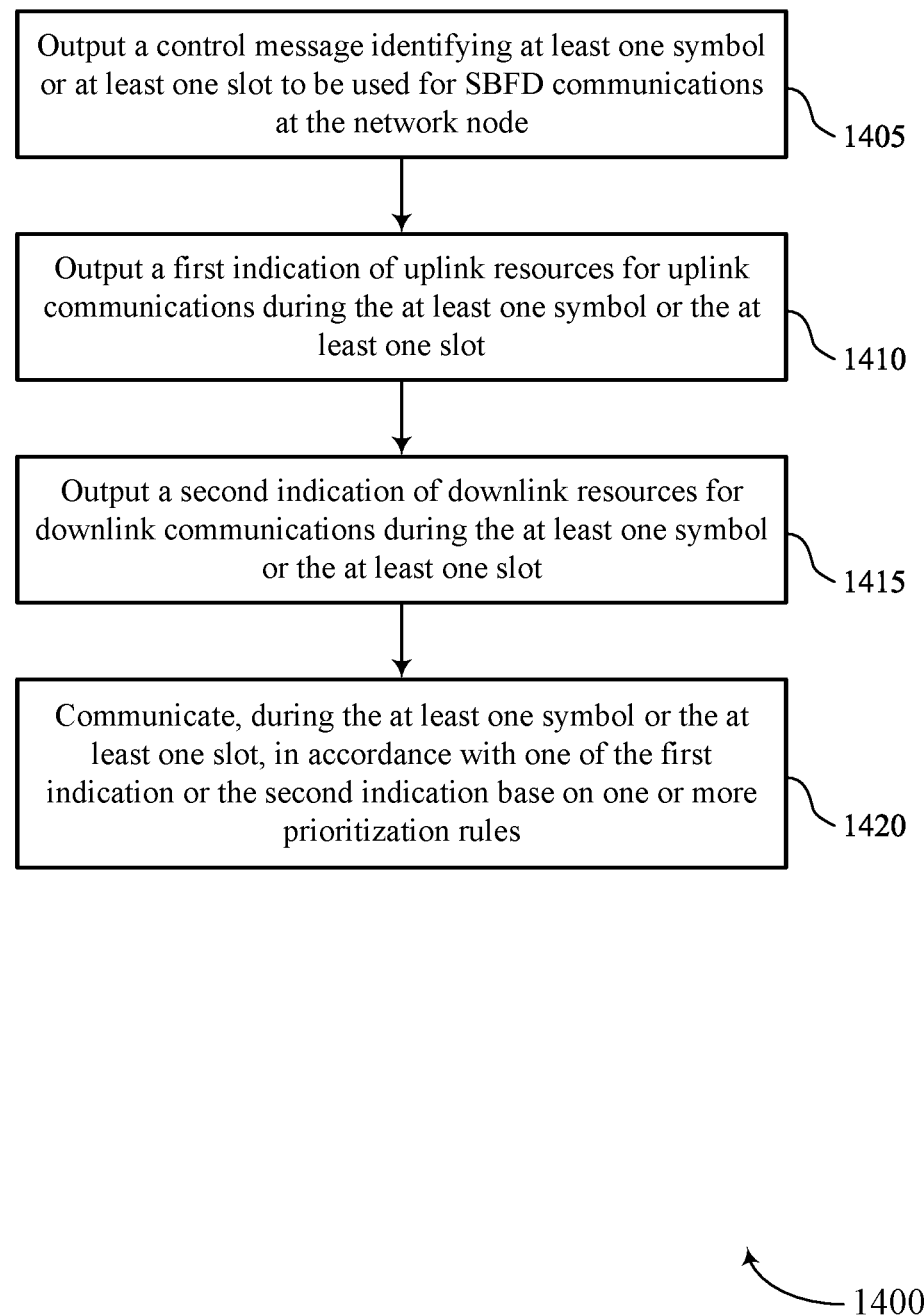

FIG. 14 illustrates a flowchart illustrating a method 1400 that supports multiplexing rules for SBFD communications in accordance with one or more aspects of the present disclosure. The operations of the method 1400 may be implemented by a network entity or its components as described herein. For example, the operations of the method 1400 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1405, the method may include outputting a control message identifying at least one symbol or at least one slot to be used for SBFD communications at the network node. The operations of 1405 may be performed in accordance with examples as disclosed herein. In some examples, aspects of the operations of 1405 may be performed by an SBFD component 1125 as described with reference to FIG. 11.

At 1410, the method may include outputting a first indication of uplink resources for uplink communications during the at least one symbol or the at least one slot. The operations of 1410 may be performed in accordance with examples as disclosed herein. In some examples, aspects of the operations of 1410 may be performed by an uplink indication component 1130 as described with reference to FIG. 11.

At 1415, the method may include outputting a second indication of downlink resources for downlink communications during the at least one symbol or the at least one slot. The operations of 1415 may be performed in accordance with examples as disclosed herein. In some examples, aspects of the operations of 1415 may be performed by a downlink indication component 1135 as described with reference to FIG. 11.

At 1420, the method may include communicating, during the at least one symbol or the at least one slot, in accordance with one of the first indication or the second indication based on one or more prioritization rules. The operations of 1420 may be performed in accordance with examples as disclosed herein. In some examples, aspects of the operations of 1420 may be performed by a rule component 1140 as described with reference to FIG. 11.

The following provides an overview of aspects of the present disclosure:

Aspect 1: A method for wireless communication at first network node, comprising: receiving a control message identifying at least one symbol or at least one slot to be used for SBFD communications at a second network node; receiving a first indication of uplink resources for uplink communications during the at least one symbol or the at least one slot; receiving a second indication of downlink resources for downlink communications during the at least one symbol or the at least one slot; and communicating with the second network node during the at least one symbol or the at least one slot in accordance with one of the first indication or the second indication based on one or more prioritization rules.

Aspect 2: The method of aspect 1, wherein the uplink resources are within at least one uplink subband or at least one flexible subband, and the downlink resources are within at least one downlink subband or the at least one flexible subband.

Aspect 3: The method of any of aspects 1 through 2, wherein the first indication is for transmission of an uplink signal within at least one uplink subband or at least one flexible subband during the at least one symbol or the at least one slot, and the second indication is for reception of an SSB within at least one downlink subband or at least one flexible subband during the at least one symbol or the at least one slot.

Aspect 4: The method of aspect 3, wherein the first indication includes an uplink SFI pertaining to the at least one symbol or the at least one slot.

Aspect 5: The method of any of aspects 3 through 4, wherein the uplink signal comprises a PUCCH signal, a PUSCH signal, an SRS, or a random access preamble.

Aspect 6: The method of any of aspects 1 through 2, wherein the first indication is for transmission of a random access preamble within at least one uplink subband or at least one flexible subband during the at least one symbol or the at least one slot, and the second indication is for reception of a downlink signal within at least one downlink subband or the at least one flexible subband during the at least one symbol or the at least one slot.

Aspect 7: The method of aspect 6, wherein the second indication includes a downlink SFI pertaining to the at least one symbol or the at least one slot.

Aspect 8: The method of any of aspects 1 through 2, wherein the first indication is for transmission of an uplink signal within at least one uplink subband or at least one flexible subband during the at least one symbol or the at least one slot, and the second indication is for monitoring a downlink control channel within at least one downlink subband or the at least one flexible subband during the at least one symbol or the at least one slot.

Aspect 9: The method of aspect 8, wherein the first indication includes an uplink SFI pertaining to the at least one symbol or the at least one slot.

Aspect 10: The method of any of aspects 1 through 9, wherein the first indication is for transmission of an uplink signal within at least one uplink subband or at least one flexible subband during the at least one symbol or the at least one slot, and the second indication is for reception of a downlink signal within at least one downlink subband or the at least one flexible subband during the at least one symbol or the at least one slot.

Aspect 11: The method of aspect 10, wherein the first indication includes an uplink SFI pertaining to the at least one symbol or the at least one slot, and the second indication includes an RRC configuration pertaining to the at least one symbol or the at least one slot.

Aspect 12: The method of aspect 11, wherein the uplink signal comprises a PUCCH signal, a PUSCH signal, an SRS, or a random access preamble.

Aspect 13: The method of aspect 10, wherein the first indication includes an RRC configuration pertaining to the at least one symbol or the at least one slot, and the second indication includes a downlink SFI pertaining to the at least one symbol or the at least one slot.

Aspect 14: The method of aspect 13, wherein the downlink signal comprises a PDCCH signal, a PDSCH signal, a CSI-RS, or a PRS.

Aspect 15: The method of aspect 10, wherein the second indication includes a flexible RRC configuration pertaining to the at least one symbol or the at least one slot.

Aspect 16: The method of aspect 15, wherein the uplink signal comprises a PUCCH signal, a PUSCH signal, an SRS, or a random access preamble.

Aspect 17: The method of aspect 10, wherein the first indication includes an uplink SFI pertaining to the at least one symbol or the at least one slot and the second indication includes a dynamic grant pertaining to the at least one symbol or the at least one slot, and the downlink signal comprises a PDSCH signal or a CSI-RS.

Aspect 18: The method of aspect 10, wherein the first indication includes an uplink SFI or a flexible SFI pertaining to the at least one symbol or the at least one slot, and the downlink signal comprises a PDCCH signal, a semi-persistent downlink signal, or a CSI-RS.

Aspect 19: The method of aspect 10, wherein the first indication includes a dynamic grant pertaining to the at least one symbol or the at least one slot and the second indication includes a downlink SFI pertaining to the at least one symbol or the at least one slot, and the uplink signal comprises a PUCCH signal, a PUSCH signal, an SRS, or a random access preamble.

Aspect 20: The method of aspect 10, wherein the second indication includes a downlink SFI or a flexible SFI pertaining to the at least one symbol or the at least one slot, and the uplink signal comprises a PUCCH signal, a PUSCH signal, an SRS, or a random access preamble.

Aspect 21: The method of aspect 10, wherein the first indication includes a dynamic grant pertaining to the at least one symbol or the at least one slot, and the downlink signal comprises a PDCCH signal, a semi-persistent downlink signal, a CSI-RS, or a PRS.

Aspect 22: The method of aspect 10, wherein the second indication includes a dynamic grant pertaining to the at least one symbol or the at least one slot, and the uplink signal comprises a PUCCH signal, a PUSCH signal, an SRS, or a random access preamble.

Aspect 23: The method of aspect 10, wherein the first indication includes an uplink SFI, a flexible SFI, an RRC configuration, or a dynamic grant pertaining to the at least one symbol or the at least one slot.

Aspect 24: The method of aspect 10, wherein the second indication includes a downlink SFI, a flexible SFI, an RRC configuration, or a dynamic grant pertaining to the at least one symbol or the at least one slot.

Aspect 25: The method of aspect 10, wherein the uplink signal comprises a PUCCH signal, a PUSCH signal, an SRS, or a random access preamble.

Aspect 26: The method of aspect 10, wherein the downlink signal comprises a PDCCH signal, a PDSCH signal, a CSI-RS, or a PRS.

Aspect 27: The method of aspect 10, wherein the one or more prioritization rules include that reception of the downlink signal is prioritized over transmission of the uplink signal during the at least one symbol or the at least one slot in an absence of a beam failure recovery procedure being triggered, and that transmission of the uplink signal is prioritized over reception of the downlink signal during the at least one symbol or the at least one slot in a presence of a beam failure recovery procedure being triggered.

Aspect 28: The method of aspect 27, wherein the second indication includes a downlink SFI pertaining to the at least one symbol or the at least one slot, and the downlink signal comprises a PDSCH signal, a semi-persistent downlink signal, or a CSI-RS.

Aspect 29: The method of aspect 27, wherein the first indication includes a flexible RRC configuration pertaining to the at least one symbol or the at least one slot, and the uplink signal comprises an SRS or a random access preamble.

Aspect 30: The method of any of aspects 10 through 29, wherein the one or more prioritization rules include that reception of the downlink signal or transmission of the uplink signal is prioritized based on a respective channel priority associated with each of the downlink signal and uplink signal.

Aspect 31: The method of any of aspects 1 through 30, wherein the uplink resources and the downlink resources are within one or more carriers to be used for TDD communications between the first network node and the second network node.

Aspect 32: The method of any of aspects 1 through 31, wherein the first indication is for a first component carrier of a radio frequency spectrum band and the second indication is for a second component carrier of the radio frequency spectrum band, the first component carrier different from the second component carrier.

Aspect 33: The method of any of aspects 1 through 32, wherein the control message further identifies one or more of a frequency location of at least one uplink subband to be used for transmission of uplink messages during the at least one symbol or the at least one slot, at least one downlink subband to be used for reception of downlink messages during the at least one symbol or the at least one slot, at least one guard band in between an uplink subband and a downlink subband during the at least one symbol or the at least one slot, and at least one flexible subband to be used for transmission of the uplink messages or reception of the downlink messages during the at least one symbol or the at least one slot.

Aspect 34: The method of aspect 1, wherein the uplink resources or the downlink resources comprise periodic resources or semi-persistent resources.

Aspect 35: The method of any of aspects 1 through 34, wherein the first network node comprises a UE and the second network node comprises a base station.

Aspect 36: A method for wireless communication at a network node, comprising: outputting a control message identifying at least one symbol or at least one slot to be used for SBFD communications at the network node; outputting a first indication of uplink resources for uplink communications during the at least one symbol or the at least one slot; outputting a second indication of downlink resources for downlink communications during the at least one symbol or the at least one slot; and communicating, during the at least one symbol or the at least one slot, in accordance with one of the first indication or the second indication based on one or more prioritization rules.

Aspect 37: The method of aspect 36, wherein the uplink resources are within at least one uplink subband or at least one flexible subband, and the downlink resources are within at least one downlink subband or the at least one flexible subband.

Aspect 38: The method of any of aspects 36 through 37, wherein the first indication is for communication of an uplink signal within at least one uplink subband or at least one flexible subband during the at least one symbol or the at least one slot, and the second indication is for communication of an SSB within at least one downlink subband or the at least one flexible subband during the at least one symbol or the at least one slot.

Aspect 39: The method of aspect 38, wherein the first indication includes an uplink SFI pertaining to the at least one symbol or the at least one slot.

Aspect 40: The method of any of aspects 38 through 39, wherein the uplink signal comprises a PUCCH signal, a PUSCH signal, an SRS, or a random access preamble.

Aspect 41: The method of any of aspects 36 through 37, wherein the first indication is for communication of a random access preamble within at least one uplink subband or at least one flexible subband during the at least one symbol or the at least one slot, and the second indication is for communication of a downlink signal within at least one downlink subband or the at least one flexible subband during the at least one symbol or the at least one slot.

Aspect 42: The method of aspect 41, wherein the second indication includes a downlink SFI pertaining to the at least one symbol or the at least one slot.

Aspect 43: The method of any of aspects 36 through 37, wherein the first indication is for communication of an uplink signal within at least one uplink subband or at least one flexible subband during the at least one symbol or the at least one slot, and the second indication is for communication using a downlink control channel within at least one downlink subband or the at least one flexible subband during the at least one symbol or the at least one slot.

Aspect 44: The method of aspect 43, wherein the first indication includes an uplink SFI pertaining to the at least one symbol or the at least one slot.

Aspect 45: The method of any of aspects 36 through 37, wherein the first indication is for communication of an uplink signal within at least one uplink subband or at least one flexible subband during the at least one symbol or the at least one slot, and the second indication is for communication of a downlink signal within at least one downlink subband or the at least one flexible subband during the at least one symbol or the at least one slot.

Aspect 46: The method of aspect 45, wherein the first indication includes an uplink SFI pertaining to the at least one symbol or the at least one slot, and the second indication includes an RRC configuration pertaining to the at least one symbol or the at least one slot.

Aspect 47: The method of aspect 46, wherein the uplink signal comprises a PUCCH signal, a PUSCH signal, an SRS, or a random access preamble.

Aspect 48: The method of any of aspects 36 through 37, wherein the first indication includes an RRC configuration pertaining to the at least one symbol or the at least one slot, and the second indication includes a downlink SFI pertaining to the at least one symbol or the at least one slot.

Aspect 49: The method of aspect 48, wherein the downlink signal comprises a PDCCH signal, a PDSCH signal, a CSI-RS, or a PRS.

Aspect 50: The method of any of aspects 36 through 37, wherein the second indication includes a flexible RRC configuration pertaining to the at least one symbol or the at least one slot.

Aspect 51: The method of aspect 50, wherein the uplink signal comprises a PUCCH signal, a PUSCH signal, an SRS, or a random access preamble.

Aspect 52: The method of any of aspects 36 through 37, wherein the first indication includes an uplink SFI pertaining to the at least one symbol or the at least one slot and the second indication includes a dynamic grant pertaining to the at least one symbol or the at least one slot, and the downlink signal comprises a PDSCH signal or a CSI-RS.

Aspect 53: The method of any of aspects 36 through 37, wherein the first indication includes an uplink SFI or a flexible SFI pertaining to the at least one symbol or the at least one slot, and the downlink signal comprises a PDCCH signal, a semi-persistent downlink signal, or a CSI-RS.

Aspect 54: The method of any of aspects 36 through 37, wherein the first indication includes a dynamic grant pertaining to the at least one symbol or the at least one slot and the second indication includes a downlink SFI pertaining to the at least one symbol or the at least one slot, and the uplink signal comprises a PUCCH signal, a PUSCH signal, an SRS, or a random access preamble.

Aspect 55: The method of any of aspects 36 through 37, wherein the second indication includes a downlink SFI or a flexible SFI pertaining to the at least one symbol or the at least one slot, and the uplink signal comprises a PUCCH signal, a PUSCH signal, an SRS, or a random access preamble.

Aspect 56: The method of any of aspects 36 through 37, wherein the first indication includes a dynamic grant pertaining to the at least one symbol or the at least one slot, and the downlink signal comprises a PDCCH signal, a semi-persistent downlink signal, a CSI-RS, or a PRS.

Aspect 57: The method of any of aspects 36 through 37, wherein the second indication includes a dynamic grant pertaining to the at least one symbol or the at least one slot, and the uplink signal comprises a PUCCH signal, a PUSCH signal, an SRS, or a random access preamble.

Aspect 58: The method of any of aspects 36 through 37, wherein the first indication includes an uplink SFI, a flexible SFI, an RRC configuration, or a dynamic grant pertaining to the at least one symbol or the at least one slot.

Aspect 59: The method of any of aspects 36 through 37, wherein the second indication includes a downlink SFI, a flexible SFI, an RRC configuration, or a dynamic grant pertaining to the at least one symbol or the at least one slot.

Aspect 60: The method of any of aspects 36 through 37, wherein the uplink signal comprises a PUCCH signal, a PUSCH signal, an SRS, or a random access preamble.

Aspect 61: The method of any of aspects 36 through 37, wherein the downlink signal comprises a PDCCH signal, a PDSCH signal, a CSI-RS, or a PRS.

Aspect 62: The method of any of aspects 45 through 61, wherein the one or more prioritization rules include that communication of the downlink signal is prioritized over communication of the uplink signal during the at least one symbol or the at least one slot in an absence of a beam failure recovery procedure being triggered, and that communication of the uplink signal is prioritized over communication of the downlink signal during the at least one symbol or the at least one slot in a presence of a beam failure recovery procedure being triggered.

Aspect 63: The method of aspect 62, wherein the second indication includes a downlink SFI pertaining to the at least one symbol or the at least one slot, and the downlink signal comprises a PDSCH signal, a semi-persistent downlink signal, or a CSI-RS.

Aspect 64: The method of aspect 62, wherein the first indication includes a flexible RRC configuration pertaining to the at least one symbol or the at least one slot, and the uplink signal comprises an SRS or a random access preamble.

Aspect 65: The method of any of aspects 45 through 64, wherein the one or more prioritization rules include that communication of the downlink signal or the uplink signal is prioritized based on a respective channel priority associated with each of the downlink signal and uplink signal.

Aspect 66: The method of any of aspects 36 through 65, wherein the uplink resources and the downlink resources are within one or more carriers to be used for TDD communications at the method.

Aspect 67: The method of any of aspects 36 through 66, wherein the first indication is for a first component carrier of a radio frequency spectrum band and the second indication is for a second component carrier of the radio frequency spectrum band, the first component carrier different from the second component carrier.

Aspect 68: The method of any of aspects 36 through 67, wherein the control message further identifies one or more of a frequency location of at least one uplink subband to be used for communication of uplink messages during the at least one symbol or the at least one slot, at least one downlink subband to be used for communication of downlink messages during the at least one symbol or the at least one slot, at least one guard band in between an uplink subband and a downlink subband during the at least one symbol or the at least one slot, and at least one flexible subband to be used for communication of the uplink messages or the downlink messages during the at least one symbol or the at least one slot.

Aspect 69: The method of aspect 36, wherein the uplink resources or the downlink resources comprise periodic resources or semi-persistent resources.

Aspect 70: The method of any of aspects 36 through 69, wherein the network node comprises a base station.

Aspect 71: A first network node for wireless communication, comprising a memory; and at least one processor coupled with the memory, wherein the at least one processor is configured to perform a method of any of aspects 1 through 35.

Aspect 72: An apparatus for wireless communication at first network node, comprising at least one means for performing a method of any of aspects 1 through 35.

Aspect 73: A non-transitory computer-readable medium having code for wireless communication stored thereon that, when executed by first network node, causes the first network node to perform a method of any of aspects 1 through 35.

Aspect 74: A network node for wireless communication, comprising a memory; and at least one processor coupled with the memory, wherein the at least one processor is configured to perform a method of any of aspects 36 through 70.

Aspect 75: An apparatus for wireless communication at a network node, comprising at least one means for performing a method of any of aspects 36 through 70.

Aspect 76: A non-transitory computer-readable medium having code for wireless communication stored thereon that, when executed by a network node, causes the network node to perform a method of any of aspects 36 through 70.

The methods described herein describe possible implementations, and the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, the term "or" is an inclusive "or" unless limiting language is used relative to the alternatives listed. For example, reference to "X being based on A or B" shall be construed as including within its scope X being based on A, X being based on B, and X being based on A and B. In this regard, reference to "X being based on A or B" refers to "at least one of A or B" or "one or more of A or B" due to "or" being inclusive. Similarly, reference to "X being based on A, B, or C" shall be construed as including within its scope X being based on A, X being based on B, X being based on C, X being based on A and B, X being based on A and C, X being based on B and C, and X being based on A, B, and C. In this regard, reference to "X being based on A, B, or C" refers to "at least one of A, B, or C" or "one or more of A, B, or C" due to "or" being inclusive. As an example of limiting language, reference to "X being based on only one of A or B" shall be construed as including within its scope X being based on A as well as X being based on B, but not X being based on A and B. Also, as used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently. Also, as used herein, the phrase "a set" shall be construed as including the possibility of a set with one member. That is, the phrase "a set" shall be construed in the same manner as "one or more" or "at least one of."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the drawings, describes example configurations and does not represent all the examples that may be implemented or that are within the scope of the claims. The term "aspect" or "example" used herein means "serving as an aspect, example, instance, or illustration," and not "preferred" or "advantageous over other aspects." The detailed description includes specific details for the purpose of providing an understanding of the described techniques. These techniques, however, may be practiced without these specific details. In some instances, structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A first network node for wireless communication, comprising:
   a memory; and
   at least one processor coupled to the memory, wherein the at least one processor is configured to:
      receive a control message identifying at least one symbol or at least one slot to be used for subband full duplex communications at a second network node;
      receive a first indication of uplink resources for uplink communications during the at least one symbol or the at least one slot;
      receive a second indication of downlink resources for downlink communications during the at least one symbol or the at least one slot; and
      communicate with the second network node during the at least one symbol or the at least one slot in accordance with one of the first indication or the second indication based on one or more prioritization rules for management of conflicting configuration information for the at least one symbol or the at least one slot.

2. The first network node of claim 1, wherein the uplink resources are within at least one uplink subband or at least one flexible subband, and the downlink resources are within at least one downlink subband or the at least one flexible subband.

3. The first network node of claim 1, wherein the first indication is for transmission of an uplink signal within at least one uplink subband or at least one flexible subband during the at least one symbol or the at least one slot, and the second indication is for reception of a synchronization signal block within at least one downlink subband or at least one flexible subband during the at least one symbol or the at least one slot.

4. The first network node of claim 3, wherein the first indication includes an uplink slot format indicator pertaining to the at least one symbol or the at least one slot.

5. The first network node of claim 1, wherein the first indication is for transmission of a random access preamble within at least one uplink subband or at least one flexible subband during the at least one symbol or the at least one slot, and the second indication is for reception of a downlink signal within at least one downlink subband or the at least one flexible subband during the at least one symbol or the at least one slot.

6. The first network node of claim 1, wherein the first indication is for transmission of an uplink signal within at least one uplink subband or at least one flexible subband during the at least one symbol or the at least one slot, and the second indication is for monitoring a downlink control channel within at least one downlink subband or the at least one flexible subband during the at least one symbol or the at least one slot.

7. The first network node of claim 1, wherein the first indication is for transmission of an uplink signal within at least one uplink subband or at least one flexible subband during the at least one symbol or the at least one slot, and the second indication is for reception of a downlink signal within at least one downlink subband or the at least one flexible subband during the at least one symbol or the at least one slot.

8. The first network node of claim 7, wherein the first indication includes an uplink slot format indicator, a flexible slot format indicator, a radio resource control configuration, or a dynamic grant pertaining to the at least one symbol or the at least one slot.

9. The first network node of claim 7, wherein the second indication includes a downlink slot format indicator, a flexible slot format indicator, a radio resource control configuration, or a dynamic grant pertaining to the at least one symbol or the at least one slot.

10. The first network node of claim 7, wherein the uplink signal comprises a physical uplink control channel signal, a physical uplink shared channel signal, a sounding reference signal, or a random access preamble.

11. The first network node of claim 7, wherein the downlink signal comprises a physical downlink control channel signal, a physical downlink shared channel signal, a channel state information reference signal, or a positioning reference signal.

12. The first network node of claim 7, wherein the one or more prioritization rules include that reception of the downlink signal is prioritized over transmission of the uplink signal during the at least one symbol or the at least one slot in an absence of a beam failure recovery procedure being triggered, and that transmission of the uplink signal is prioritized over reception of the downlink signal during the at least one symbol or the at least one slot in a presence of a beam failure recovery procedure being triggered.

13. The first network node of claim 7, wherein the one or more prioritization rules include that reception of the downlink signal or transmission of the uplink signal is prioritized based on a respective channel priority associated with each of the downlink signal and uplink signal.

14. The first network node of claim 1, wherein the uplink resources and the downlink resources are within one or more carriers to be used for time division duplex communications between the first network node and the second network node.

15. The first network node of claim 1, wherein the first indication is for a first component carrier of a radio frequency spectrum band and the second indication is for a second component carrier of the radio frequency spectrum band, the first component carrier different from the second component carrier.

16. A network node for wireless communication, comprising:
 a memory; and
 at least one processor coupled to the memory, wherein the at least one processor is configured to:
  output a control message identifying at least one symbol or at least one slot to be used for subband full duplex communications at the network node;
  output a first indication of uplink resources for uplink communications during the at least one symbol or the at least one slot;
  output a second indication of downlink resources for downlink communications during the at least one symbol or the at least one slot; and
  communicate, during the at least one symbol or the at least one slot, in accordance with one of the first indication or the second indication based on one or more prioritization rules for management of conflicting configuration information for the at least one symbol or the at least one slot.

17. The network node of claim 16, wherein the uplink resources are within at least one uplink subband or at least one flexible subband, and the downlink resources are within at least one downlink subband or the at least one flexible subband.

18. The network node of claim 16, wherein the first indication is for communication of an uplink signal within at least one uplink subband or at least one flexible subband during the at least one symbol or the at least one slot, and the second indication is for communication of a synchronization signal block within at least one downlink subband or the at least one flexible subband during the at least one symbol or the at least one slot.

19. The network node of claim 18, wherein the first indication includes an uplink slot format indicator pertaining to the at least one symbol or the at least one slot.

20. The network node of claim 16, wherein the first indication is for communication of a random access preamble within at least one uplink subband or at least one flexible subband during the at least one symbol or the at least one slot, and the second indication is for communication of a downlink signal within at least one downlink subband or the at least one flexible subband during the at least one symbol or the at least one slot.

21. The network node of claim 16, wherein the first indication is for communication of an uplink signal within at least one uplink subband or at least one flexible subband during the at least one symbol or the at least one slot, and the second indication is for communication using a downlink control channel within at least one downlink subband or the at least one flexible subband during the at least one symbol or the at least one slot.

22. The network node of claim 16, wherein the first indication is for communication of an uplink signal within at least one uplink subband or at least one flexible subband during the at least one symbol or the at least one slot, and the second indication is for communication of a downlink signal within at least one downlink subband or the at least one flexible subband during the at least one symbol or the at least one slot.

23. The network node of claim 22, wherein the first indication includes an uplink slot format indicator, a flexible slot format indicator, a radio resource control configuration, or a dynamic grant pertaining to the at least one symbol or the at least one slot.

24. The network node of claim 22, wherein the second indication includes a downlink slot format indicator, a flexible slot format indicator, a radio resource control configuration, or a dynamic grant pertaining to the at least one symbol or the at least one slot.

25. The network node of claim 22, wherein the uplink signal comprises a physical uplink control channel signal, a physical uplink shared channel signal, a sounding reference signal, or a random access preamble.

26. The network node of claim 22, wherein the downlink signal comprises a physical downlink control channel signal, a physical downlink shared channel signal, a channel state information reference signal, or a positioning reference signal.

27. The network node of claim 22, wherein the one or more prioritization rules include that communication of the downlink signal is prioritized over communication of the uplink signal during the at least one symbol or the at least one slot in an absence of a beam failure recovery procedure being triggered, and that communication of the uplink signal is prioritized over communication of the downlink signal during the at least one symbol or the at least one slot in a presence of a beam failure recovery procedure being triggered.

28. The network node of claim 22, wherein the one or more prioritization rules include that communication of the downlink signal or the uplink signal is prioritized based on a respective channel priority associated with each of the downlink signal and uplink signal.

29. A method for wireless communication at a first network node, comprising:
    receiving a control message identifying at least one symbol or at least one slot to be used for subband full duplex communications at a second network node;
    receiving a first indication of uplink resources for uplink communications during the at least one symbol or the at least one slot;
    receiving a second indication of downlink resources for downlink communications during the at least one symbol or the at least one slot; and
    communicating with the second network node during the at least one symbol or the at least one slot in accordance with one of the first indication or the second indication based on one or more prioritization rules for management of conflicting configuration information for the at least one symbol or the at least one slot.

30. A method for wireless communication at a network node, comprising:
    outputting a control message identifying at least one symbol or at least one slot to be used for subband full duplex communications at the network node;
    outputting a first indication of uplink resources for uplink communications during the at least one symbol or the at least one slot;
    outputting a second indication of downlink resources for downlink communications during the at least one symbol or the at least one slot; and
    communicating, during the at least one symbol or the at least one slot, in accordance with one of the first indication or the second indication based on one or more prioritization rules for management of conflicting configuration information for the at least one symbol or the at least one slot.

* * * * *